United States Patent
Honda et al.

(10) Patent No.: US 6,765,342 B1
(45) Date of Patent: Jul. 20, 2004

(54) FIELD EMISSION-TYPE ELECTRON SOURCE AND MANUFACTURING METHOD THEREOF

(75) Inventors: Yoshiaki Honda, Kyoto (JP); Tsutomu Ichihara, Hirakata (JP); Takuya Komoda, Sanda (JP); Koichi Aizawa, Neyagawa (JP); Yoshifumi Watabe, Tondabayashi (JP); Takashi Hatai, Neyagawa (JP)

(73) Assignee: Matsushita Electric Work, Ltd., Osaka (JP)

( * ) Notice: Subject to any disclaimer, the term of this patent is extended or adjusted under 35 U.S.C. 154(b) by 64 days.

(21) Appl. No.: 09/688,869

(22) Filed: Oct. 17, 2000

(30) Foreign Application Priority Data

Oct. 18, 1999 (JP) ............................................. 11-295959
Jan. 26, 2000 (JP) ........................................ 2000-016388
Jan. 26, 2000 (JP) ........................................ 2000-016394

(51) Int. Cl.$^7$ ................................................ H01J 1/30
(52) U.S. Cl. ...................................... 313/319; 313/497
(58) Field of Search ................................. 313/495, 496, 313/497, 309, 310, 351, 336; 257/9, 10, 11, 30, 37, 38, 39

(56) References Cited

U.S. PATENT DOCUMENTS

| | | | |
|---|---|---|---|
| 3,665,241 A | | 5/1972 | Spindt et al. ................ 313/351 |
| 5,329,207 A | | 7/1994 | Cathey et al. |
| 5,430,300 A | | 7/1995 | Yue et al. |
| 5,894,189 A | * | 4/1999 | Ogasawara et al. ......... 313/309 |
| 5,990,605 A | * | 11/1999 | Yoshikawa et al. ......... 313/309 |
| 6,023,124 A | | 2/2000 | Chuman et al. |
| 6,066,922 A | | 5/2000 | Iwasaki et al. |
| 6,249,080 B1 | * | 6/2001 | Komoda et al. ............ 313/310 |
| 6,316,873 B1 | * | 11/2001 | Ito et al. ..................... 313/496 |
| 2001/0040430 A1 | | 11/2001 | Ito et al. |
| 2003/0197457 A1 | | 10/2003 | Komoda et al. |

FOREIGN PATENT DOCUMENTS

| | | |
|---|---|---|
| EP | 0865064 | 9/1998 |
| EP | 0874384 | 10/1998 |
| EP | 0896355 | 2/1999 |
| EP | 08986353 | 2/1999 |
| EP | 913849 | 5/1999 |
| EP | 989577 | 3/2000 |
| JP | 6-60795 | 3/1994 |
| JP | 7-262908 | 10/1995 |
| JP | 8-250766 | 9/1996 |
| JP | 9-259795 | 10/1997 |
| JP | 10149984 | 6/1998 |
| JP | 11329213 | 11/1999 |
| JP | 2000100316 | 4/2000 |
| KR | 199936606 | 5/1999 |

OTHER PUBLICATIONS

English Language abstract of JP–8–250766.
English Language abstract of JP–11–329213.
English Language abstract of JP–2000–100316.

* cited by examiner

Primary Examiner—Ashok Patel
(74) Attorney, Agent, or Firm—Greenblum & Bernstein, P.L.C.

(57) ABSTRACT

A field emission-type electron source 10 includes an insulative substrate 11 in the form of a glass substrate having an electroconductive layer 8 formed thereon. A strong electrical field drift layer 6 in the form of an oxidized porous polycrystalline silicon layer is formed over the electroconductive layer 8. This electroconductive layer 8 includes a lower electroconductive film 8a, made of copper and formed on the insulative substrate 11, and an upper electroconductive film 8b made of aluminum and formed over the electroconductive film 8a. The strong electrical field drift layer 6 is formed by forming a polycrystalline silicon layer on the electroconductive layer 8, rendering the polycrystalline silicon layer to be porous and finally oxidizing it. The upper electroconductive film 8b has a property that reacts easily with silicon and, therefore, formation of an amorphous layer which would occur during formation of the polycrystalline silicon layer can be suppressed.

19 Claims, 12 Drawing Sheets

FIELD EMISSION-TYPE ELECTRON SOURCE AND MANUFACTURING METHOD THEREOF

BACKGROUND OF THE INVENTION

1. Field of the Invention

The present invention relates to a field emission-type electron source-for emitting electron beams under influence of an electric field and also to a method of manufacturing the same.

2. Description of the Prior Art

Of the various field emission-type electron sources known in the art, a Spindt-type electrode such as disclosed in, for example, U.S. Pat. No. 3,665,241 has been well known. The Spindt-type electrode includes a substrate having a multiplicity of emitter chips of a generally triangular pyramid shape arranged on one surface thereof, emission holes through which respective tips of the emitter chips are exposed to the outside, and gate layers disposed in an insulated relation to the emitter chips. When the Spindt-type electrode is in use, electrons are emitted in vacuum from the tips of the emitter chips through the emission holes upon application of a high voltage to the gate layers then serving as negative electrode relative to the emitter chips.

It has, however, been found that the Spindt-type electrode does not only require a complicated manufacturing process, but difficulty has hitherto been encountered to tailor the emitter chips of the generally triangular pyramid shape to precise dimensions. Accordingly, when it comes to application of the field emission electron source to, for example, a planar light emitter or a flat display, the Spindt-type electrode is incapable of being manufactured in a large format with a sufficiently large surface area for electron emission.

The Spindt-type electrode has an additional problem in that the electric field tends to converge so as to concentrate on the tips of the emitter chips. Accordingly, where the degree of vacuum around and adjacent the tips of the emitter chips is so low as to permit residue gas to drift around the tips of the emitter chips, the residue gas tends to be positive ionized by the electrons emitted and the resultant positive ions would subsequently collide against the tips of the emitter chips. Once this occurs, the tips of the emitter chips are damaged (for example, as a result of the ion bombardment), resulting in reduction in stability and efficiency of the current density of the electrons emitted and also reduction in lifetime of the emitter chips.

Accordingly, in order to substantially eliminate a possible of occurrence of those problems, the Spindt-type electrode has to be used in a highly evacuated atmosphere (for example, about $10^{-5}$ to about $10^{-6}$ Pa), and, for this reason, the use of the Spindt-type electrode tends to result in increase of cost and handling difficulty.

To substantially eliminate the problems inherent in the Spindt-type electrode, the field emission-type electron sources of a type utilizing MIM (Metal Insulator Metal) and MOS (Metal Oxide Semiconductor) have been suggested. As the nomenclature indicates, the MIM electron source makes use of a metal-insulator-metal laminar structure whereas the MOS electron source makes use of a metal-oxide film-semiconductor laminar structure. In these field emission-type electron sources, the insulator film or the oxide film is required to have a relatively small thickness in order for the electron emission efficiency to be increased (i.e., in order for an increased mass of electrons to be emitted). However, the excessively smaller the film thickness of the insulator film or the oxide film, the more often dielectric breakdown may occur when a voltage is applied between upper and lower electrodes of the laminar structure. Accordingly, in the suggested field emission-type electron sources, the extent to which the film thickness of the insulator film or the oxide film can be reduced is limited. In view of the foregoing, the suggested field emission-type electron sources requires means to be taken to avoid any possible dielectric breakdown and, therefore, a problem is often encountered in sufficiently increasing the electron emission efficiency (electron extracting efficiency).

On the other hand, the Japanese Laid-open Patent Publication No. 8-250766 discloses a field emission-type electron source (a semiconductor element for emission of cold electrons) including, in order to increase the electron emission efficiency, a monocrystalline semiconductor substrate such as, for example, silicon substrate having one surface region anodized to define a porous semiconductor layer (a porous silicon layer) which is in turn overlaid by a metal thin-film. Application of a voltage between the semiconductor substrate and the metal thin-film results in emission of electrons.

However, in the field emission-type electron source disclosed in the above mentioned Japanese publication, a material for the substrate is limited to a semiconductor and, therefore, difficulty has hitherto been encountered in providing an electron source of a large surface format at a reduced cost. Also, this known field emission-type electron source is susceptible to a so-called popping phenomenon, accompanied by a varying quantity of electrons emitted. For this reason, application of this known field emission-type electron sources to a planar light emitter or a flat display would result in a pattern of uneven distribution of light.

In the Japanese Patents No. 2987140 (Japanese Patent Application No. 10-272340) and No. 296684 (Japanese Patent Application No. 10-272342), the inventors of the present invention have suggested the field emission-type electron source of a type wherein the porous polycrystalline silicon layer is oxidized by the use of a rapid thermal oxidation technique. Oxidation of the porous polycrystalline silicon layer by the use of the specific technique results in formation, between the electroconductive substrate and the metal thin-film, of a strong electrical field drift layer in which electrons injected from the electroconductive substrate can drift.

By way of example, as shown in FIG. 16, the field emission-type electron source (hereinafter, merely referred to "electron source") 10' includes an electroconductive substrate that is defined by an n-type silicon substrate 1. The n-type silicon substrate 1 has a major surface, with a strong electrical field drift layer (hereinafter, merely referred to "drift layer") 6 formed on the major surface of the silicon substrate 1. The metal thin-film identified by 7 is formed on the drift layer 6 as a surface electrode. An ohmic electrode 2 is formed on the back surface of the silicon substrate 1.

As shown in FIG. 17, the electron source 10' when in use is disposed in a highly evacuated envelope together with a collector electrode 21. confronting the surface electrode 7. A direct current voltage Vps is applied between the surface electrode 7 and the silicon substrate 1 (specifically, the ohmic electrode 2) so that the surface electrode 7 can be held at a positive potential relative to the silicon substrate 1. On the other hand, a direct current voltage Vc is applied between the collector electrode 21 and the surface electrode 7 so that the collector electrode 21 can be held at a positive potential relative to the surface electrode 7. When the direct current voltages Vps and Vc are applied in the manner described above, electrons injected from the silicon substrate 1 into the drift layer 6 drift within the drift layer 6 and are then emitted through the surface electrode 7 (Single-dotted lines in FIG. 17 indicate flow of electrons $e^-$ emitted through the surface electrode 7.) Accordingly, it is considered desirable that the surface electrode 7 employed in the electron source 10' is made of a material having a low work function.

The current flowing between the surface electrode 7 and the ohmic electrode 2 is generally referred to as a diode current Ips. On the other hand, the current flowing between the collector electrode 21 and the surface electrode 7 is generally referred to as an emitted electron current Ie. The higher the ratio (Ie/Ips) of the emitted electron current Ie relative to the diode current Ips, the higher the electron emission efficiency. In this electron source 10' now under discussion, the electrons can be emitted even though the direct current voltage Vps is as low as 10 to 20 volts.

The electron source 10' of the structure now under discussion has so low a dependency of the electron emission characteristic on the degree of vacuum that no popping phenomenon will occur at the time of emission of the electrons. For this reason, the electrons can be emitted stably at a high electron emission efficiency.

As shown in FIG. 18, the drift layer 6 is considered including at least polycrystalline silicon columns (grains) 51, thin silicon oxide films, fine crystalline silicon particles 63 in the nanometer order and silicon oxide films 64 serving as an insulator. The silicon oxide films 52 are formed on the surfaces of the polycrystalline silicon columns 51 with the fine crystalline silicon particles 63 interposed among the polycrystalline silicon columns 51. The silicon oxide films 64 each having a thickness smaller than the particle size of crystals forming the fine silicon particles 63 are formed on the surfaces of the fine crystalline silicon particles 63.

In the drift layer 6 of the structure described above, it may be thought that the surface of each grain is rendered porous while a core of the respective grain remains in a crystal form. Accordingly, the electric field applied to the drift layer 6 almost acts on the silicon oxide films 64. As the result, the electrons injected are accelerated under influence of the strong electric field acting on the silicon oxide films 64 so as to drift towards the surface through interstices among the polycrystalline silicon columns 51 as shown by the arrow-headed lines A in FIG. 10 (upward in FIG. 10). Accordingly, the electron emission efficiency can be increased. It is to be noted that the electrons arriving at the surface of the drift layer 6 are considered hot electrons that are tunneled through the surface electrode 7 into the highly evacuated atmosphere within the envelope. The surface electrode 7 has a thickness chosen to be within the range of 10 to 15 nm.

In the electron source 10' shown in FIGS. 16 and 17, in place of the semiconductor substrate such as the n-type silicon substrate I used for the electroconductive substrate, an insulating substrate such as, for example, a glass substrate, on which an electroconductive layer such as, for example, an ITO film is formed may be advantageously employed. In this case, the electron source of a relatively large surface format can be fabricated at a reduced cost.

FIG. 19 illustrates the electron source 10" utilizing the electroconductive substrate that is formed by depositing on an insulative substrate 11 such as a glass substrate on which an electroconductive layer 8 such as an ITO film is formed. In the electron source 10" shown in FIG. 19, the electroconductive layer 8 in the form of the ITO film is formed on the insulating substrate 11. The drift layer 6 is formed on the electroconductive layer 8. The surface electrode 7 in the form of a metal thin-film is formed on the drift layer 6. The drift layer 6 referred to above is formed by depositing a non-doped polycrystalline silicon layer on the electroconductive layer 8, anodizing the polycrystalline silicon layer to render the latter to be porous and finally oxidizing or nitriding the polycrystalline silicon layer by the use of the rapid thermal technique.

Even in this electron source 10", the electrons injected from the electroconductive layer 8 into the drift layer 6 drift within the drift layer 6 before they are emitted to the outside through the surface electrode 7, in a manner substantially similar to that discussed in connection with the electron source 10' shown in FIG. 17. Even though the direct current voltage Vps applied between the surface electrode 7 and the electroconductive layer 8 in the electron source 10" is as low as 10 to 20 volts, the electrons can be emitted.

However, in the electron source 10" utilizing the insulative substrate 11 as discussed above, the drift layer 6 is formed by depositing a non-doped polycrystalline silicon layer on the electroconductive layer 8, anodizing the polycrystalline silicon layer to render the latter to be porous and finally oxidizing the polycrystalline silicon layer by the use of the rapid thermal oxidization technique. Since the temperature at which oxidization is carried out is relatively high (for example, ranging from 800 to 900° C.), the insulative substrate 11 is required to be prepared from an expensive quartz glass. For this reason, the electron source 10" has a problem in that increase of the surface format of the electron source 10" and/or reduction in cost of making the electron source 10" are hampered. To substantially eliminate the problem inherent in the electron source 10" (hence, to enable the process to be performed at reduced temperatures), it may be envisioned to oxidize the porous polycrystalline silicon layer in contact with acid or irradiation of ultraviolet rays in a gaseous atmosphere containing at least one of oxygen and ozone. This oxidization technique allows the insulative substrate 11 to be prepared by the use of a glass substrate (such as, for example, a non-alkaline glass substrate, a low alkaline glass substrate or a soda lime glass substrate) that has a lower heat resistance than that of the quartz glass substrate and is more inexpensive than the quartz glass substrate.

It is, however, to be noted that in each of the electron sources 10' and 10", although the non-doped polycrystalline silicon layer is rendered to be porous in its entirety, it may be rendered to be porous in part.

However, during the manufacture of the electron source 10" utilizing the insulative substrate 11 and particularly at the time the non-doped polycrystalline silicon layer is deposited on the electroconductive layer 8 in the form of the ITO film, an amorphous silicon layer of a high resistance tends to be formed at the interface between the electroconductive layer 8 and the non-doped polycrystalline silicon layer. For this reason, the amorphous silicon layer of a high resistance remains between the electroconductive layer 8 and the drift layer 6 or at the interface of the drift layer 6 with the electroconductive layer 8 and, consequently, supply of the diode current Ips tends to be accompanied by a voltage drop at the amorphous layer which in turn results in decrease of the voltage applied to the drift layer 6. This brings about a problem that the direct current voltage Vps necessary to secure a desired emission current Ie tends to be increased to such an extent as to result in reduction of electron emission efficiency. Also, once the voltage drop occurs at the amorphous silicon layer, heating takes place in the amorphous silicon layer, resulting in a loss of thermal stability. A Schottky barrier is observed between the electroconductive layer 8 and the amorphous silicon layer, and the voltage drop as well occurs at the Schottky barrier.

Further, in the electron source 10" utilizing the insulative substrate 11, the thickness of the amorphous layer of a high resistance has a variance in the plane so that the potential in the plane has also a variance. Therefore, the degree to make the layer porous during the anodic oxidation has a variance in the plane. As the result, there may be caused such a disadvantage that the amount of emitted electrons has also a variance in the plane.

The presence of the amorphous layer of a high resistance in the drift layer 6 may often constitute a cause of formation of an amorphous layer 6a of a relatively great thickness in the drift layer 6 as shown in, for example, FIG. 20. In such case, the resistance of the drift layer 6 increases and the current flowing through the drift layer 6 decreases. For this reason, as compared with the electron source 10' utilizing the n-type silicon substrate 1, a problem is found in that the amount of the electrons emitted tends to be reduced. In FIG. 20, reference numeral 6c represents a crystallized layer, other than the amorphous layer 6a, that is included in the drift layer 6.

Microscopic observation of the section of the electron source 10" utilizing the insulative substrate 11, that is carried out by the use of a transmission electron microscope (TEM) has indicated that the amorphous layer 6a has an uneven thickness, as shown in FIG. 21. As discussed above, in the drift layer 6, the strongest electric field appears in the silicon oxide film 64 formed on the surface of the fine crystalline silicon layer 63. Accordingly, as shown in FIG. 21, the uneven thickness of the amorphous layer 6a results in a varying field intensity from place to place on the drift layer 6. For this reason, the electron source 10" is incapable of allowing the electrons to be emitted uniformly from the entire surface of the surface electrode 7. Thus, the electron source 10" has a problem in that the energies of the electrons emitted from the surface electrode 7 are not distributed uniformly.

SUMMARY OF THE INVENTION

Accordingly, the present invention has been developed with a view to substantially eliminating the above discussed problems in the prior art and is intended to provide an improved electron source (field emission-type electron source) having a high electron emission efficiency and a high thermal stability, and a method of manufacturing the same. Another object of the present invention is to provide an improved electron source of the kind referred to above that is inexpensive, but can emit an increased amount of electrons.

To this end, according to one aspect of the present invention, there is provided an electron source (i) which includes a substrate, an electroconductive layer formed on a major surface of the substrate, a semiconductor layer formed on the electroconductive layer, a drift layer (strong electrical field drift layer) in the form of an oxidized or nitrided porous semiconductor layer formed on a surface of the semiconductor layer remote from the electroconductive layer, and a surface electrode formed on the drift layer, (ii) in which when a voltage is applied with the surface electrode used as a positive electrode relative to the electroconductive layer, electrons injected from the electroconductive layer drift in the drift layer and are then emitted through the surface electrode, (iii) wherein the semiconductor layer is made of a low resistance semiconductor material utilizing means for lowering a resistance thereof or a low resistance semiconductor material formed by a process for lowering a resistance thereof.

In the electron source, since the low resistance semiconductor crystalline layer is formed on the electroconductive layer, the Schottky barrier resulting from the electroconductive layer can have a reduced thickness. For this reason, the current can be supplied by tunneling to reduce the voltage drop which would occur across the Schottky barrier. Accordingly, as compared with the electron source in which the high resistance amorphous semiconductor layer is formed on the electroconductive layer, the electron source of the present invention can exhibit a high electron emission efficiency and a high thermal stability.

In the above-mentioned electron source, preferably, at least a portion of the electroconductive layer adjacent the drift layer with respect to a direction of thickness thereof is made of an electroconductive material effective to suppress formation of an amorphous layer in the drift layer. In such case, the amorphous layer contained in the drift layer can be reduced and, therefore, the amount of electrons emitted can be increased while the cost is reduced.

In the above-mentioned electron source, preferably, the electroconductive layer is made up of at least two electroconductive films laminated one above the other. In this case, the uppermost one of the electroconductive films has a property of easily reacting with the semiconductor at about a temperature at which the drift layer is formed. This is particularly advantageous in that by properly selecting the material for the electroconductive film except the uppermost one, the resistance of the electroconductive layer can be reduced.

In the above-mentioned electron source, the uppermost electroconductive film may be made of Al, Ni, or an alloy including Al and Ni as main components. In this case, the uppermost electroconductive layer may be produced with a low cost. It is preferable that the thickness of the uppermost electroconductive layer is not greater than 50 nm. In this case, the amount of diffusion from the uppermost electroconductive film into the drift layer may be reduced. Further, any possible increase of the probability of scattering of electrons within the drift layer can be suppressed. For this reason, reduction of the electron emission efficiency can be suppressed.

In the above-mentioned electron source, the uppermost electroconductive film may be made of a material hard to diffuse into the drift layer as compared with Al. In such case, diffusion from the uppermost electroconductive film into the drift layer can advantageously be suppressed, resulting in improvement of the heat resistance and the time-dependent stability.

Also, in the above-mentioned electron source, a silicide layer may be formed between the electroconductive layer and the semiconductor layer so that the resistance of the semiconductor layer can be lowered in the presence of the silicide layer. The presence of the silicide layer is effective to reduce the height of the Schottky barrier as compared with the case in which the high resistance amorphous semiconductor layer is formed on the electroconductive layer and also effective to increase the electron emission efficiency and the thermal stability. For this reason, diffusion of constituent elements of the electroconductive layer from the electroconductive layer into the semiconductor crystalline layer can advantageously be prevented. Also, alloying of the semiconductor crystalline layer resulting from the diffusion can also be suppressed to thereby increase the thermal stability.

In the above-mentioned electron source, the semiconductor layer may include a plurality of films having different resistances, with one of the films closer to the electroconductive layer exhibiting a lower resistance to thereby reduce the resistance of the semiconductor layer. In this case, a film of the semiconductor layer closer to the electroconductive layer can have a lower resistance and, therefore, the electron emission efficiency can be increased.

In the above-mentioned electron source, the semiconductor layer may be of a structure having a continuously varying resistance, with a portion of the semiconductor layer closer to the electroconductive layer exhibiting a lower resistance to thereby reduce the resistance of the semiconductor layer. In this case, a portion of the semiconductor layer closer to the electroconductive layer can have a lower resistance and, therefore, the electron emission efficiency can be increased.

In the above-mentioned electron source, the semiconductor layer having a low resistance may be formed by heating to crystallize after formation of an amorphous semiconductor layer. The semiconductor layer having a low resistance may be formed by annealing to crystallize after formation of an amorphous semiconductor layer. The semiconductor layer having a low resistance may be formed by laser annealing to crystallize after formation of an amorphous semiconductor layer.

In the above-mentioned electron source, the semiconductor layer having a low resistance may be formed by heating with use of hydrogen to crystallize after formation of an amorphous semiconductor layer. The semiconductor layer having a low resistance may be formed by crystallizing by means of a hydrogen plasma irradiation after formation of an amorphous semiconductor layer. The semiconductor layer having a low resistance may be formed by crystallizing by means of a hydrogen ion irradiation after formation of an amorphous semiconductor layer.

In the above-mentioned electron source, it is preferable that the amorphous semiconductor layer is a low resistance amorphous semiconductor layer doped with impurities.

The above-mentioned electron source may include impurities added to the semiconductor layer to reduce the resistance of the semiconductor layer.

The above-mentioned electron source may include impurities added to the semiconductor layer to form another semiconductor layer over the semiconductor layer having a low resistance. It may include impurities added by an ion implantation to the semiconductor layer to form another semiconductor layer over the semiconductor layer having a low resistance. It may include impurities added by an impurity diffusion to the semiconductor layer to form another semiconductor layer over the semiconductor layer having a low resistance.

In the above-mentioned electron source, it is preferable that heat treatment has been carried after formation of at least one of the semiconductor layer, a porous semiconductor layer, the drift layer and the surface electrode.

In the above-mentioned electron source, it is preferable that the drift layer includes semiconductor crystalline columns lying perpendicular to the major surface of the substrate, fine semiconductor crystals in nanometer order positioned among the semiconductor crystalline columns and insulating films having a film thickness smaller than a crystal size of the fine semiconductor crystals and formed on surfaces of the fine semiconductor crystals. In such case, in the drift layer, electrons injected from the electroconductive layer into the drift layer can be advantageously accelerated to drift under influence of an electric field applied to the insulating film without colliding against fine semiconductor crystals. At this time, heat evolved in the drift layer is dissipated through the semiconductor crystalline columns and, therefore, the electrons can be emitted at a high efficiency without being accompanied by the popping phenomenon.

The semiconductor layer may be made of a polycrystalline semiconductor. In this case, the surface area of the electron source can advantageously be increased.

Preferably, the polycrystalline semiconductor may be made of a semiconductor material capable of being formed by a low temperature process of not higher than 600° C. In such case, a non-alkaline glass substrate that is inexpensive as compared with the quarts glass substrate can be used for the insulative substrate and, therefore, the manufacturing cost of the electron source can advantageously be reduced. Also, the surface area of the electron source can further be increased. Depending on the temperature at which the polycrystalline semiconductor layer is formed, a glass substrate having a low heat resistance as compared with the non-alkaline glass substrate such as a low alkaline glass substrate or a soda lime glass substrate can be employed for the insulative substrate.

In the above-mentioned electron source, the semiconductor layer may be made of silicon. Where silicon is used as material for the semiconductor layer, a silicon process can be employed and, therefore, where the electron source is applied in a display device or the like, the pattern of the electroconductive layer can be made fine or to a high precision.

In the above-mentioned electron source, the electroconductive layer may be also made of metal. In this case, the resistance of the electroconductive layer can easily be reduced. Yet, in the electron source, the substrate preferably is a glass substrate having a heat resistance to a temperature higher than or equal to 500° C.

In another aspect, the present invention provides a method of manufacturing an electron source (i) including a substrate, an electroconductive layer formed on a major surface of the substrate, a semiconductor crystalline layer formed on the electroconductive layer, a drift layer in the form of an oxidized or nitrided porous semiconductor layer formed on a surface of the semiconductor crystalline layer remote from the electroconductive layer, and a surface electrode formed on the drift layer, (ii) in which when a voltage is applied with the surface electrode used as a positive electrode relative to the electroconductive layer, electrons injected from the electroconductive layer drift in the drift layer and are then emitted through the surface electrode, (iii) wherein the semiconductor crystalline layer is made of a low resistance semiconductor material utilizing means for lowering a resistance thereof or a low resistance semiconductor material formed by a process for lowering a resistance thereof. The method includes the steps of (iv) forming the electroconductive layer on the substrate, (v) forming an amorphous semiconductor layer on the electroconductive layer and then crystallizing the amorphous semiconductor layer to form the semiconductor crystalline layer, (vi) forming a semiconductor layer over the semiconductor crystalline layer and then rendering at least a portion of the semiconductor layer to be porous to thereby form the porous semiconductor layer, (vii) oxidizing or nitriding the porous semiconductor layer to form the drift layer, (viii) and forming the surface electrode on the drift layer. Hereupon, the amorphous semiconductor layer may be poly-crystallized, for example, by heating.

The electron source manufacturing method is effective to provide the electron source capable of exhibiting a high electron emission efficiency and a high thermal stability as compared with the electron source wherein the high resistance amorphous semiconductor layer is formed on the electroconductive layer.

In the method discussed above, the heating may be performed by means of a thermal annealing or a laser annealing. In such case, as compared with the electron source wherein the high resistance amorphous semiconductor layer is formed on the electroconductive layer, it is possible to provide the electron source capable of exhibiting a high electron emission efficiency and a high thermal stability.

In the method discussed above, the amorphous semiconductor layer may be crystallized by heating with use of hydrogen. The amorphous semiconductor layer may be crystallized by a hydrogen plasma irradiation. The amorphous semiconductor layer may be crystallized by a hydrogen ion irradiation. In such case, it is possible to provide. the electron source capable of exhibiting a high electron emission efficiency and a high thermal stability as compared with the electron source wherein the high resistance amorphous semiconductor layer is formed on the electroconductive layer.

Also, in the practice of the method of the present invention, the amorphous semiconductor layer may be made of a low resistance amorphous semiconductor doped with impurities. In this case, the resistance of the amorphous semiconductor layer can be optimally controlled to thereby optimally reduce the resistance of the low resistance semiconductor crystalline layer.

It is to be noted that in the foregoing manufacturing method, in place of the step (v) of forming an amorphous semiconductor layer on the electroconductive layer and then crystallizing the amorphous semiconductor layer to form the semiconductor crystalline layer, (ix) a step of forming on the electroconductive layer a semiconductor crystalline layer containing impurities added thereto may be employed. In such case, it is possible to provide the electron source capable of exhibiting a high electron emission efficiency and a high thermal stability as compared with the electron source wherein the high resistance amorphous semiconductor layer is formed on the electroconductive layer.

The impurities may be added to the semiconductor crystalline layer by means of an ion implantation or an impurity diffusion. Even in this case, it is possible to provide the electron source capable of exhibiting a high electron emission efficiency and a high thermal stability as compared with the electron source wherein the high resistance amorphous semiconductor layer is formed on the electroconductive layer.

Also, after formation of at least one of the semiconductor crystalline layer, the semiconductor layer, the porous semiconductor layer, the drift layer and the surface electrode, heat treatment may be carried out. In this case, the Schottky barrier formed by the electroconductive layer and the semiconductor crystalline layer can be reduced or removed, making it possible to provide the electron source capable of exhibiting a high electron emission efficiency and a high thermal stability.

The present invention also relates to a field emission-type electron source which comprises a substrate; an electroconductive layer formed on a major surface of the substrate; a low resistance semiconductor layer composed of a low resistance semiconductor material formed on the electroconductive layer; a non-doped semiconductor layer formed on the low resistance semiconductor layer; a strong electrical field drift layer in the form of an oxidized or nitrided porous semiconductor layer formed on a surface of the non-doped semiconductor layer-remote from the electroconductive layer; and a surface electrode formed on the strong electrical field drift layer, in which when a voltage is applied with the surface electrode used as a positive electrode relative to the electroconductive layer, electrons injected from the electroconductive layer drift in the strong electrical field drift layer and are then emitted through the surface electrode.

At least a portion of the electroconductive layer adjacent the strong electrical field drift layer with respect to a direction of thickness thereof is made of an electroconductive material effective to suppress formation of an amorphous layer in the strong electrical field drift layer.

The electroconductive layer can be made up of at least two electroconductive films laminated one above the other, and wherein the uppermost one of the electroconductive films has a property of easily reacting with a semiconductor at about a temperature at which the strong, electrical field drift layer is formed.

A silicide layer can be interposed between the electroconductive layer and the low resistance semiconductor layer and effective to lower the resistance of the low resistance semiconductor layer.

The low resistance semiconductor layer can comprise a plurality of films having different resistances and wherein one of the films closer to the electroconductive layer can exhibit a lower resistance.

The low resistance semiconductor layer can be of a structure having a continuously varying resistance, with a portion of the low resistance semiconductor layer closer to the electroconductive layer exhibiting a lower resistance to thereby reduce the resistance of the low resistance semiconductor layer.

The low resistance semiconductor layer can be formed by heating to crystallize after formation of an amorphous semiconductor layer.

The low resistance semiconductor layer can formed by crystallizing an amorphous semiconductor layer using hydrogen after formation of the amorphous semiconductor layer.

The low resistance semiconductor layer can be a low resistance amorphous semiconductor layer doped with impurities.

Impurities can be added to the low-resistance semiconductor layer to reduce resistance.

Impurities can be added to the low resistance semiconductor layer to form another semiconductor layer over the low resistance semiconductor layer.

Heat treatment can be carried out after formation of at least one of the low resistance semiconductor layer. a porous semiconductor layer, the strong electrical field drift layer and the surface electrode.

BRIEF DESCRIPTION OF THE DRAWINGS

The present invention will become readily understood from the following description of preferred embodiments thereof made with reference to the accompanying drawings, in which.

DESCRIPTION OF THE EMBODIMENTS

This application is based on the Japanese Patent Applications No. 11-295959, No. 2000-016388 and No. 2000-016394, respective disclosures of which are hereby incorporated by reference.

First Embodiment

Figure 1:
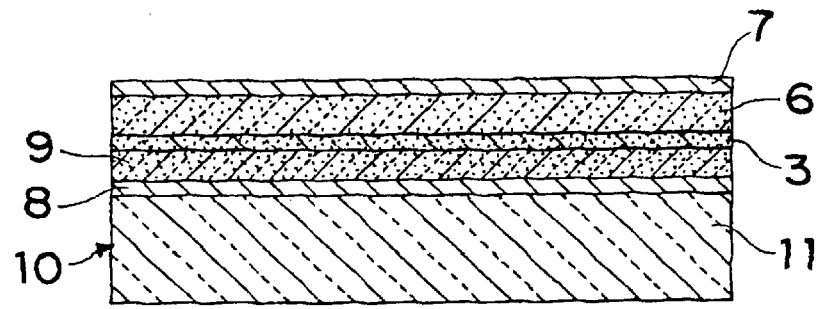
FIG. 1 is a schematic sectional elevation view of an electron source according to a first embodiment of the present invention.

Referring to FIG. 1, an electron source 10 (field emission-type electron source) according to the first embodiment includes an insulative substrate 11 in the form of a glass substrate (such as, for example, a non-alkaline glass substrate). On one major surface of the insulative substrate 11, an electroconductive layer 8 made of tungsten is formed. An n-type polycrystalline silicon layer 9, which is a semiconductor crystalline layer, is formed on a surface of the electroconductive layer 8. On the n-type polycrystalline silicon layer 9, a non-doped polycrystalline silicon layer 3 is formed. On the polycrystalline silicon layer 3, a drift layer 6 (a strong electrical field drift layer) in the form of a porous polycrystalline silicon layer is formed. A surface electrode 7 is formed on a surface of the drift layer 6. Hereupon, the non-doped polycrystalline silicon layer 3 is not essential and may be dispensed with, allowing the drift layer 6 to be formed direct on the n-type polycrystalline silicon layer 9.

The electron source 10 according to the first embodiment is featured in the following points. That is, no amorphous layer is formed on the electroconductive layer 8 and, instead, the n-type polycrystalline silicon layer 9 having a low resistance is formed thereon with the drift layer 6 formed on the surface of the n-type polycrystalline silicon layer 9 opposite to the electroconductive layer 8.

As described above, in the electron source 10 according to the first embodiment, since the n-type polycrystalline silicon layer 9, which is the semiconductor crystalline layer having a low resistance, is formed on the electroconductive layer 8, as compared with the prior art electron source in which the amorphous silicon layer having a high resistance is formed on the electroconductive layer 8, a Schottky barrier attributable to the electroconductive layer 8 is so thin as to allow the current to flow through tunneling. This in turn brings about reduction of the voltage drop at the Schottky barrier. Thus, as compared with the prior art electron source in which the amorphous silicon layer having a high resistance is formed on the electroconductive layer 8, the electron source 10 is effective to exhibit an increased electron emission efficiency and an increased thermal stability.

Although the electroconductive layer 8 employed in the first embodiment has been described as made of tungsten (W), material therefor may not be limited to it, but one, or an alloy of some, of copper (Cu), aluminum (Al), nickel (Ni), molybdenum (Mo), chromium (Cr), platinum (Pt), titan (Ti), cobalt (Co), zirconium (Zi), tantalum (Ta), hafnium (Hf), palladium (Pd), vanadium (V), niobium (Nb), manganese (Mn), iron (Fe), ruthenium (Ru), osmium (Os), iridium (Ir), gold (Au), silver (Ag) and silicon (Si) may be employed therefor. The electroconductive layer 8 may also be made of a meta oxide (transparent electrode) such as, for example, ITO $SnO_2$ and ZnO. A lamination of films of some of those material can again be employed. In addition, the electroconductive layer 8 may be in the form of the metal oxide laminated with selected ones of the above listed metallic materials including tungsten (W) or laminated with an alloy of some of those metallic materials.

The process for manufacturing the electron source 10 according to the first embodiment will now be described with reference to FIGS. 2A to 2E.

Figure 2A:
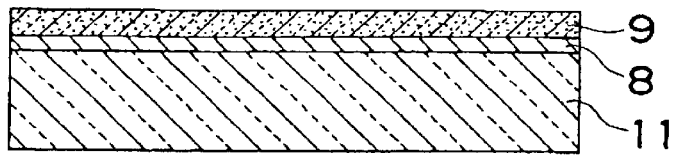
FIGS. 2A to 2E are schematic sectional elevation views of the intermediate or final products, showing the sequence of manufacture of the electron source shown in FIG. 1.

At the outset, the electroconductive layer 8 made of, for example, tungsten is deposited on the first major surface (upper surface in FIG. 2A) of the insulative substrate 11 by the use of any known sputtering technique. After the formation of the electroconductive layer 8, n-type impurities are doped in the electroconductive layer B by the use of, for example, any known plasma CVD technique to deposit a n-type amorphous silicon layer, followed by crystallization by heating of the n-type amorphous silicon layer to provide the n-type polycrystalline silicon layer 9 as shown in FIG. 2A.

Other than that described above, the n-type polycrystalline silicon layer 9 may be formed, after the deposition of the n-type amorphous silicon layer by heating the n-type amorphous silicon layer to crystallize, which heating may be carried out by either annealing or laser-annealing; subjecting the n-type amorphous silicon layer to a heat treatment using hydrogen to crystallize; or irradiating the n-type amorphous silicon layer with hydrogen plasmas or hydrogen ions to crystallize.

Again alternatively, instead of the n-type amorphous silicon layer deposited on the electroconductive layer 8, an n-type polycrystalline silicon layer 9 having a low resistance, which is added with impurities, may be deposited direct on the electroconductive layer 8. Formation of the n-type polycrystalline silicon layer 9 may also be possible by means of ion implantation of impurities into a polycrystalline silicon layer, after the deposition of a non-doped polycrystalline silicon layer, under operating conditions sufficient to avoid formation of the amorphous silicon layer on the electroconductive layer 8. Alternatively formation of the n-type polycrystalline silicon layer 9 is again possible by diffusing impurities into a polycrystalline silicon layer, after the non-doped polycrystalline silicon layer has been deposited, under operating conditions sufficient to avoid formation of the amorphous silicon layer on the electroconductive layer 8.

Figure 2B:
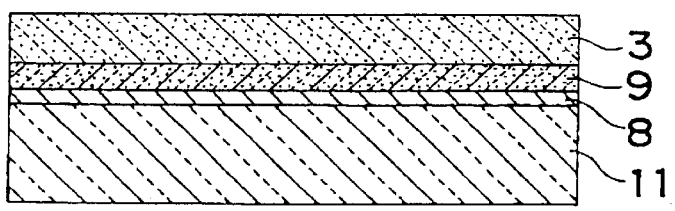

In any event, after the formation of the n-type polycrystalline silicon layer 9, the non-doped polycrystalline silicon layer 3 having a predetermined thickness (for example, 1.5 μm) is formed by the use of any known plasma CVD technique to provide the structure shown in FIG. 2B. Since the non-doped polycrystalline silicon layer 3 is deposited by the use of the plasma CVD technique, it can be formed by a low temperature process wherein a heating temperature not higher than 600° C. (specifically within the range of 100 to 600° C.) is employed. It is, however, to be noted that the process of forming the non-doped polycrystalline silicon layer 3 may not be limited to the plasma CVD process, but a catalytic CVD process may be employed to form the non-doped polycrystalline silicon layer 3. Even with the use of the catalytic CVD process, the non-doped polycrystalline silicon layer 3 can be formed in the low temperature process not higher than 600° C.

Figure 2C:
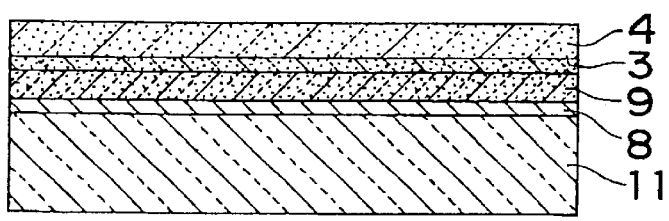

After the formation of the non-doped polycrystalline silicon layer 3, an anodic oxidation process is carried out under a predetermined condition, while the polycrystalline silicon layer 3 is irradiated by light, with the use of an anodizing bath wherein an electrolyte comprising a 55 wt % hydrogen fluoride aqueous solution and ethanol mixed together in a mixing ratio of 1:1 is filled and wherein a platinum electrode (not shown) and the electroconductive layer 8 are used as negative and positive electrodes, respectively. Through this anodic oxidation process, a predetermined depth of the polycrystalline silicon layer 3 down from the surface thereof opposite to the n-type polycrystalline silicon layer 9 is rendered porous to thereby form a porous polycrystalline silicon layer 4 as shown in FIG. 2C. In the first embodiment now under discussion, the anodic oxidation process is carried out in such a manner that throughout the entire period of anodic oxidation the power of light used to irradiate the polycrystalline silicon layer 3 and the current density are kept constant. However, this anodizing condition may be varied suitably (for example, the current density may be variable). Although in the first embodiment now under discussion a surface region of the polycrystalline silicon layer 3 is rendered porous, the polycrystalline silicon layer 3 may be rendered porous in its entirety (that is, the porous polycrystalline silicon layer 4 may be formed directly on the n-type polycrystalline silicon layer 9).

Figure 2D:
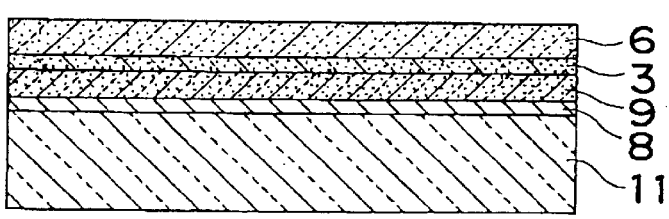

After the anodic oxidation process, the electrolyte is drained from the anodizing bath, and an acid (for example, approximately 10% dilute nitric acid, approximately 10% dilute sulfuric acid or aqua regia) is filled in the anodizing bath. Using the anodizing bath containing the acid and wherein the platinum electrode (not shown) and the electroconductive layer B are used as negative and positive electrodes, respectively, a constant current is applied to oxidize the porous polycrystalline silicon layer 4 to form a drift layer 6 as shown in FIG. 2D.

Figure 2E:
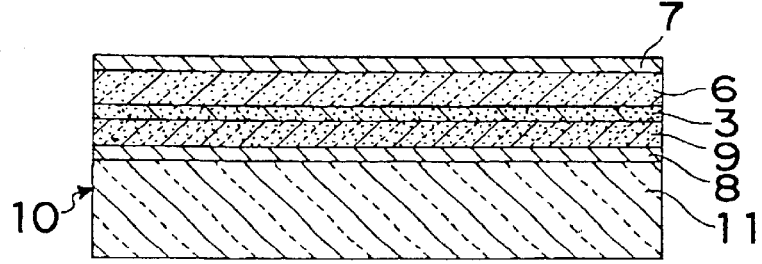

After the formation of the drift layer 6, a surface electrode 7 in the form of an electroconductive thin-film (for example, a gold thin-film) is formed on the drift layer 6 by means of, for example, any known deposition technique, thereby completing the electron source 10 of the structure shown in FIG. 2E. Although in the first embodiment now under discussion the surface electrode 7 has a film thickness of 15 nm, the thickness thereof is not limited thereto and the surface electrode 7 may have any suitable film thickness provided that electrons flowing through the drift layer 6 can be tunneled. Also, although in the first embodiment now under discussion the electroconductive thin-film that eventually forms the surface electrode 7 is formed by any suitable deposition technique, any suitable process other than the deposition technique, for example, a sputtering technique may be employed to form the electroconductive thin-film.

With the method discussed above, the electron source 10 capable of exhibiting a high electron emission efficiency and a high thermal stability can be obtained. Also, the polycrystalline silicon layer 3 can be formed by the low temperature process such as, for example, the plasma CVD process. The porous polycrystalline silicon layer 4 is oxidized in contact with acid. Also, the surface electrode 7 is formed by the use of the vapor deposition technique or the sputtering technique. For these reasons, the electron source 10 can be manufactured by the low temperature process of not higher than 600° C. Accordingly, for the insulative substrate 11, a non-alkaline glass substrate that is inexpensive as compared with the quartz glass substrate can be employed. As a result, the manufacturing cost can be reduced and its surface area can be increased. Also, depending on the temperature at which the polycrystalline silicon layer 3 is formed, it is possible to use a glass substrate having a heat resistance that is relatively low as compared with that of the non-alkaline glass substrate such as a low-alkaline glass substrate or a soda lime glass substrate.

The electron source 10 fabricated by the method described above has a low dependency of the electron emission characteristic on the degree of vacuum as is the case with the electron source disclosed in the previously discussed Japanese Patents No. 2987140 (Japanese Patent Application No. 10-272340) and No. 296684 (Japanese Patent Application No. 10-272342). Also, no popping phenomenon occur at the time of emission of electrons. For this reason, the electron source 10 can emit electrons in a stable fashion.

Figure 18:
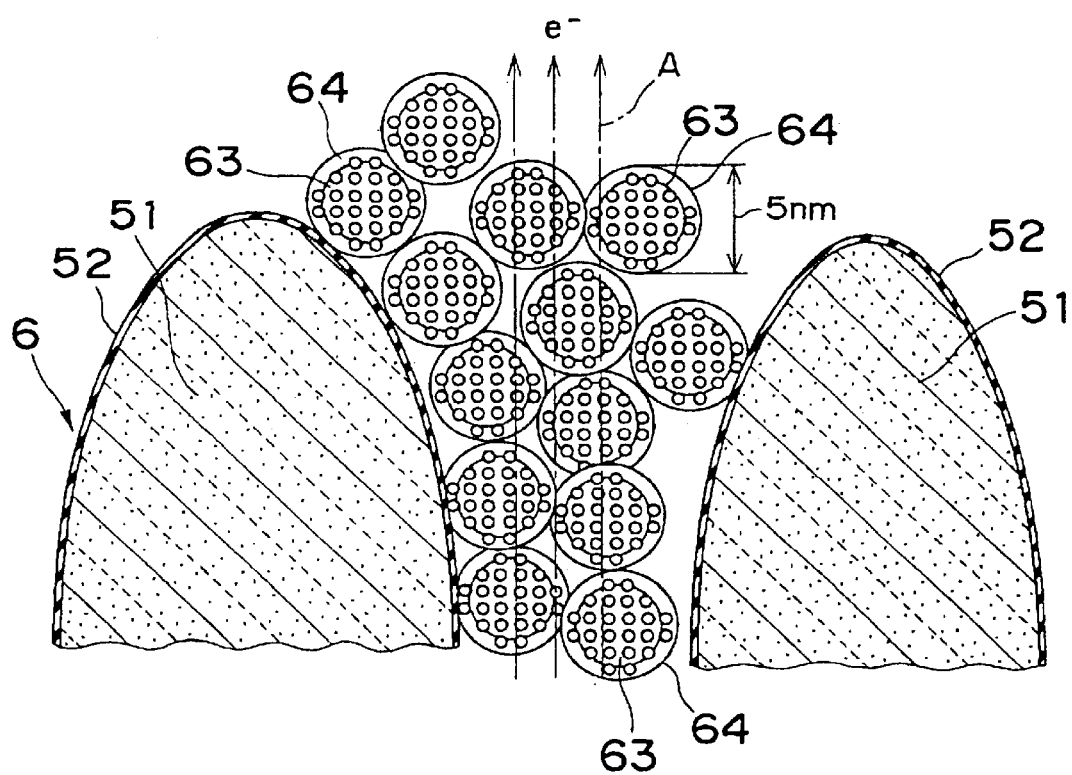
FIG. 18 is a schematic diagram, on an enlarged scale, showing a mechanism of emission of electrons from the electron source of FIG. 16.
Figure 19:
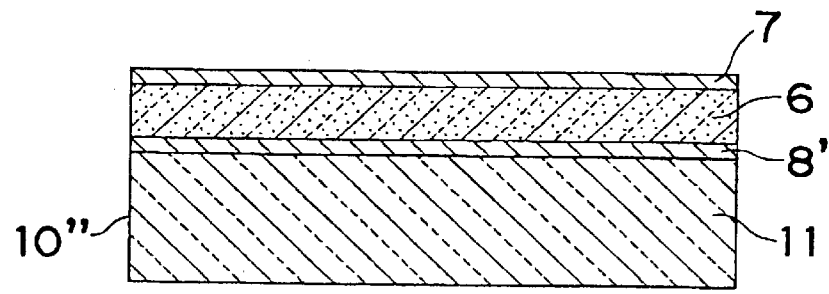
FIG. 19 is a schematic sectional elevation view of another prior art electron source.

As is the case with the prior art electron source, and as shown in FIG. 18, the drift layer can be regarded as made up of at least polycrystalline silicon columns 51, thin silicon oxide films 52, fine crystalline silicon layers 63 and silicon oxide films 64. Specifically, in the drift layer 6, it is considered that respective surface regions of the various grains represent a porous structure while core regions thereof remain in a crystal form.

According to the above-described method, the porous polycrystalline silicon layer 4 is oxidized in contact with acid. However, it may be oxidized by illuminating it with ultraviolet rays under a gaseous atmosphere containing at least one of, for example, oxygen and ozone. In such case, oxidization is preferably be carried out at a temperature within the range of 100 to 600° C. Although the temperature at which oxidization is carried out may be higher than 600° C., oxidization is preferred to be carried out at a temperature within the range of 100 to 600° C. since the inexpensive glass substrate can be employed for the insulative substrate 11. Where the silicon substrate of the quartz glass substrate is employed for the substrate, the porous polycrystalline silicon layer 4 may be oxidized by the use of the rapid thermal method (such as, for example, RTC method).

Figure 3:
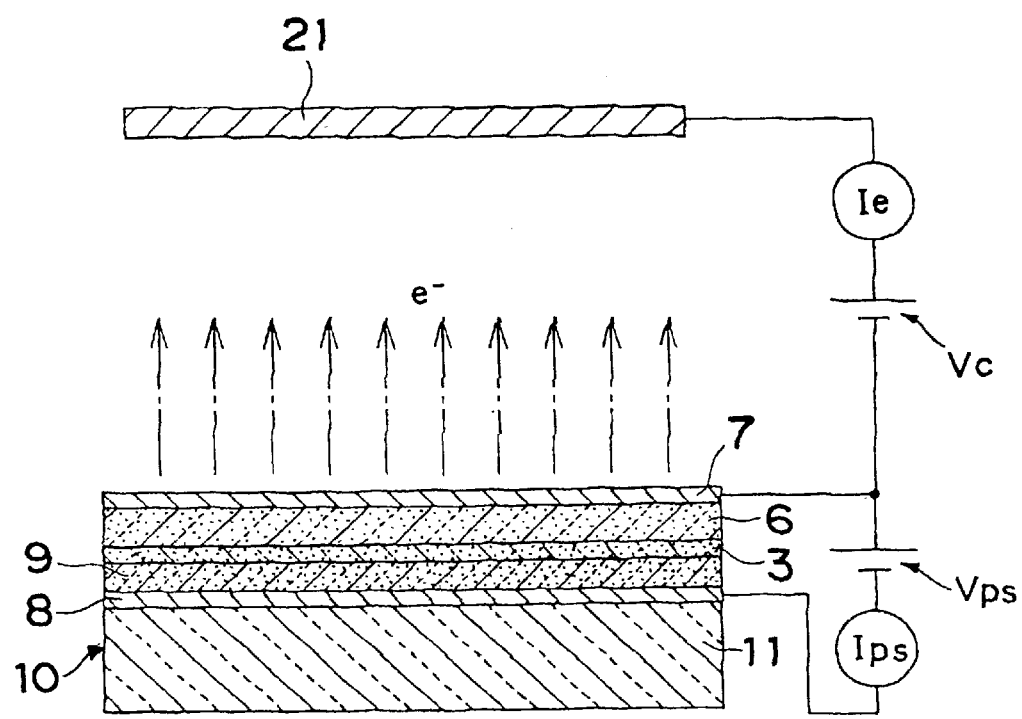
FIG. 3 is a schematic view of the electron source of FIG. 1, showing the manner in which electrons are emitted from the electron source.
Figure 17:
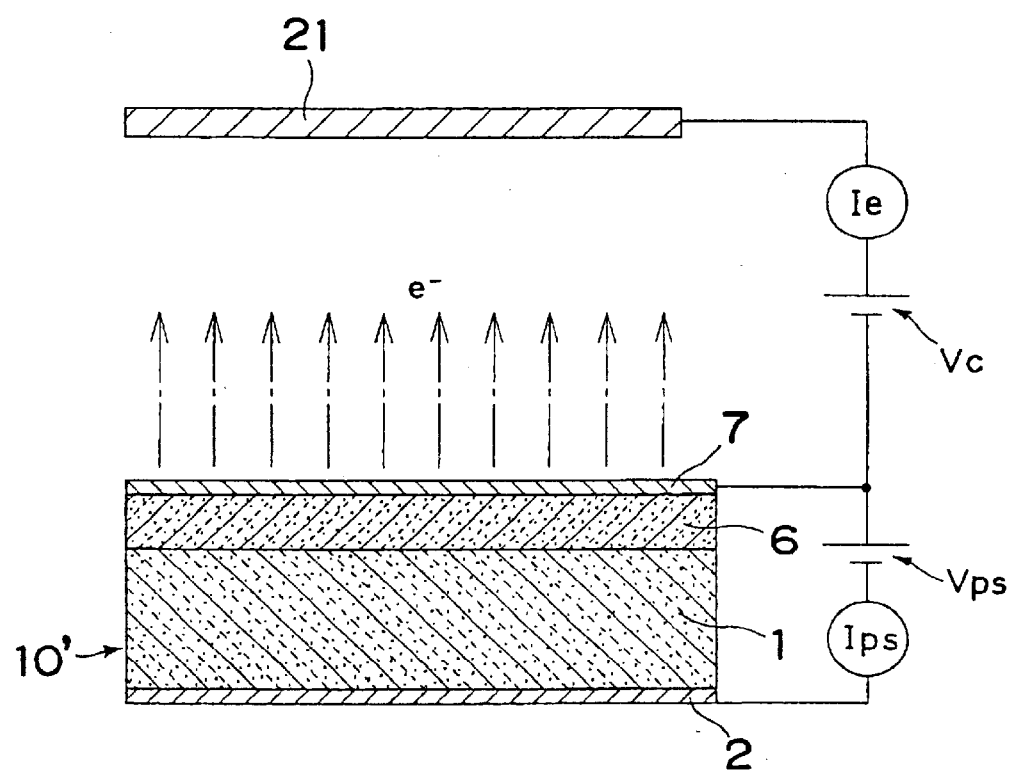
FIG. 17 is a schematic view of the prior art electron source of FIG. 16, showing the manner in which electrons are emitted from the electron source.

The electron source 10 according to the first embodiment of the present invention basically functions in a manner similar to the prior art electron source shown in FIG. 17. By way of example, as shown in FIG. 3, within a highly evacuated envelope (not shown), a collector electrode 21 is disposed within the envelope in face-to-face relation with the surface electrode 7. A direct current voltage Vps is applied between the surface electrode 7 and the n-type silicon substrate 1 (specifically, the ohmic electrode 2) so that the surface electrode 7 can be held at a positive potential relative to the silicon substrate 1. On the other hand, a direct current voltage Vc is applied between the collector electrode 21 and the surface electrode 7 so that the collector electrode 21 can be held at a positive potential relative to the surface electrode 7. When the direct current voltages Vps and Vc are applied in the manner described above, electrons injected from the n-type silicon substrate 1 into the drift layer 6 drift within the drift layer 6 and are then emitted through the surface electrode 7 (Single-dotted lines in FIG. 3 indicate the flow of electrons $e^-$ emitted through the surface electrode 7). Accordingly, even with the electron source 10 according to the illustrated embodiment, as is the case with the prior art electron source, the electrons can be emitted even though the direct current voltage Vps applied between the surface electrode 7 and the electroconductive layer 8 is as low as 10 to 20 volts.

According to the first embodiment, the drift layer 6 is formed of the porous polycrystalline silicon that has been oxidized. However, the drift layer 6 may be formed of porous polycrystalline silicon that has been nitrided, or in the form of a porous polycrystalline semiconductor layer that has been oxidized or nitrided. Also, the n-type polycrystalline silicon layer 9 may be of a multi-layered structure wherein a plurality of n-type polycrystalline silicon layers having different resistances (impurity concentrations) are laminated one above the other, with the lowest resistance exhibited by one of the n-type polycrystalline silicon layers closest to the electroconductive layer 8. The n-type polycrystalline silicon layer 9 may have a resistance (impurity concentration) that continuously varies in a direction across the thickness thereof, with the lowest resistance exhibited by a portion of the n-type polycrystalline silicon layer 9 closest to the electroconductive layer 8. In the first embodiment, as a semiconductor crystal layer of a low resistance, the n-type polycrystalline silicon layer 9 is employed. However, in place of the n-type polycrystalline silicon layer 9, a p-type polycrystalline silicon layer may be employed.

After the formation of the n-type polycrystalline silicon layer 9 that is a semiconductor crystal layer, the polycrystalline silicon layer 3 that is a crystalline semiconductor layer, the porous polycrystalline silicon layer 4, the drift layer 6 or the surface electrode 7, at least one heat treatment (at a temperature not higher than 600° C.) is effective to reduce or eliminate the Schottky barrier, which may be formed by the electroconductive layer 8 and the n-type polycrystalline silicon layer 9. Thus, the electron source 10 capable of exhibiting a high electron emission efficiency and a high thermal stability can be obtained.

Second Embodiment

Figure 4:
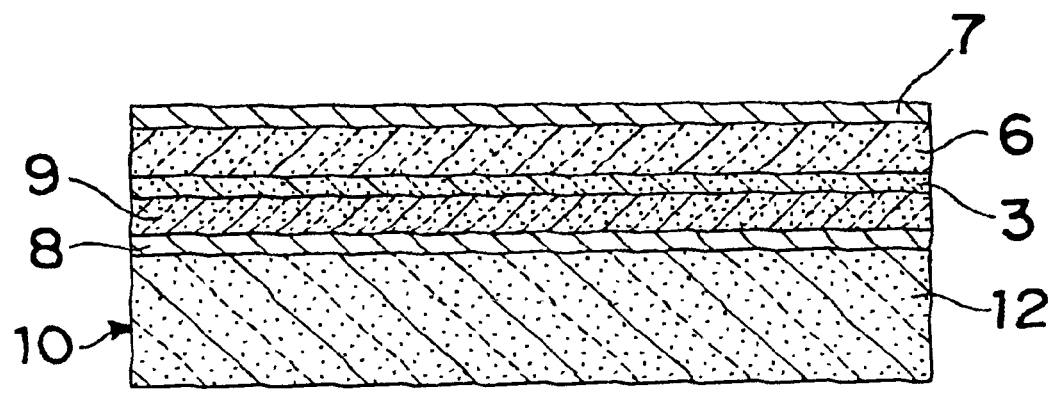
FIG. 4 is a schematic sectional elevation view of the electron source according to a second embodiment of the present invention.

The electron source according to the second embodiment is substantially similar in structure to that according to the first embodiment. However, the second embodiment differs from the first embodiment in that as shown in FIG. 4 pertaining to the second embodiment a p-type silicon substrate 12 is employed for the substrate and the electroconductive layer 8 is defined by an n-type silicon layer.

More specifically, in the second embodiment, in place of the insulative substrate 11 employed in the foregoing first embodiment, the p-type silicon substrate 12 is employed. Because of this, not only can the electroconductive layer 8 be formed by the n-type silicon layer, but the electroconductive layer 8 and the n-type polycrystalline silicon layer 9 can be grid-aligned.

Even with the electron source 10 according to the second embodiment, as is the case with that according to the first embodiment, it can exhibit a high electron emission efficiency and a high thermal stability. The electron source 10 according to the second embodiment can be fabricated by the method substantially identical with that employed to provide the electron source according to the first embodiment, with an exception that the electroconductive layer 8 is formed by, for example, an epitaxial growth method, an ion implantation method or a diffusion method. This is because in the second embodiment the p-type silicon substrate 12 is employed for the substrate in contrast to the insulative substrate employed in the first embodiment.

Third Embodiment

Figure 5:
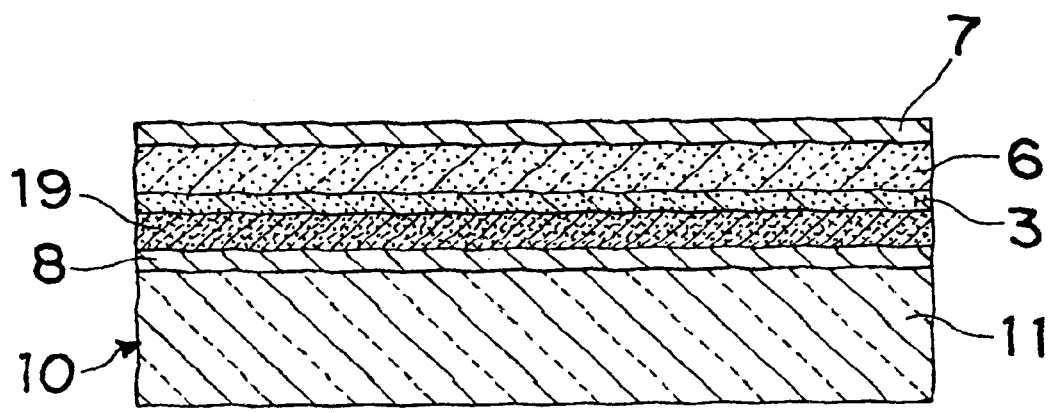
FIG. 5 is a schematic sectional elevation view of the electron source according to a third embodiment of the present invention.

Referring to FIG. 5, the electron source 10 shown therein includes an insulative substrate 11 in the form of a glass substrate (for example, a non-alkaline glass substrate). On one major surface of the insulative substrate 11, an electroconductive layer 8 made of tungsten is formed. A tungsten silicide ($WSi_2$) layer 19 is formed on a surface of the electroconductive layer 8. A non-doped polycrystalline silicon layer 3 is formed on the silicide layer 19, which is in turn covered by a drift layer 6 made of an oxidized porous polycrystalline silicon. A surface electrode 7 is formed on a surface of the drift layer 6. Hereupon, the non-doped polycrystalline silicon layer 3 is not essential and may be dispensed with, allowing the drift layer 6 to be formed direct on the silicide layer 19.

The electron source 10 according to the third embodiment is featured in that the silicide layer 19 is formed on the electroconductive layer 8 and the drift layer 6 is formed on one of opposite surfaces of the silicide layer 19.

According to the third embodiment as described above, since the silicide layer 19 having a low resistance is formed on the electroconductive layer 8, as compared with the prior art electron source in which the amorphous silicon layer having a high resistance is formed on the electroconductive layer 8, the height of a Schottky barrier generated at the interface can be reduced, allowing the current to flow in an increased amount through the drift layer 6 (that is, to increase the diode current Ips) and, for this reason, the electron emission efficiency can be increased. Also, an increased thermal stability can be appreciated since the amount of heat dissipated can be reduced. Also, since the silicide layer 19 is formed on the electroconductive layer 8, it is possible to avoid diffusion of constitute elements of the electroconductive layer 8 from the electroconductive layer 8 into the polycrystalline silicon layer 3 and the drift layer 6, resulting in increase of the thermal stability. No Schottky barrier virtually exist between the electroconductive layer 8 and the silicide layer 19, but it may exist between the silicide layer 19 and the polycrystalline silicon layer 3. However, the height of the Schottky barrier is smaller than that which would be formed between the electroconductive layer 8 and the polycrystalline silicon layer 3 when no silicide layer is employed and, therefore, the voltage drop across the Schottky barrier can advantageously be reduced.

Although in the third embodiment the electroconductive layer 8 has been described as made of tungsten (W), material therefor may not be limited to it, but one, or an alloy of some, of copper (Cu), aluminum (Al), nickel (Ni), molybdenum (Mo), chromium (Cr), platinum (Pt), titan (Ti), cobalt (Co), zirconium (Zi), tantalum (Ta), hafnium (Hf), palladium (Pd), vanadium (V), niobium (Nb), manganese (Mn), iron (Fe), ruthenium (Ru), rhodium (Rh), rhenium (Re), osmium (Os), iridium (Ir), gold (Au), silver (Ag) and silicon (Si) may be employed therefor. A lamination of films of some of those materials may also be employed. The electroconductive layer 8 may also be made of a metal oxide (transparent electrode) such as, for example, ITO, $SnO_2$ and ZnO. In addition, the electroconductive layer 8 may be in the form of the metal oxide laminated with selected ones of the above listed metallic materials including tungsten (W) or laminated with an alloy of some of those metallic materials.

The process for manufacturing the electron source 10 according to the third embodiment will now be described with reference to FIGS. 6A to 6E.

Figure 6A:
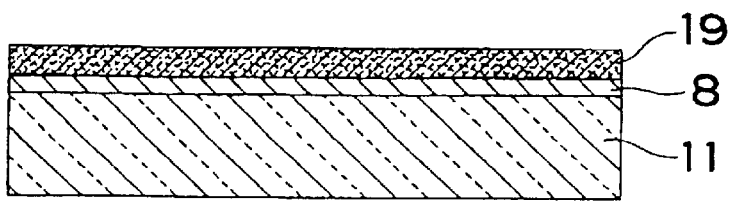
FIGS. 6A to 6E are schematic sectional elevation views of the intermediate or final products, showing the sequence of manufacture of the electron source shown in FIG. 5.

At the outset, the electroconductive layer 8 made of, for example, tungsten is deposited on the first major surface (upper surface in FIG. 6A) of the insulative substrate 11 by the use of any known sputtering technique. After the formation of the electroconductive layer B, the tungsten silicide ($WSi_2$) layer 19 is formed on the electroconductive layer 8 by the use of, for example, any known sputtering technique as shown in FIG. 6A.

Figure 6B:
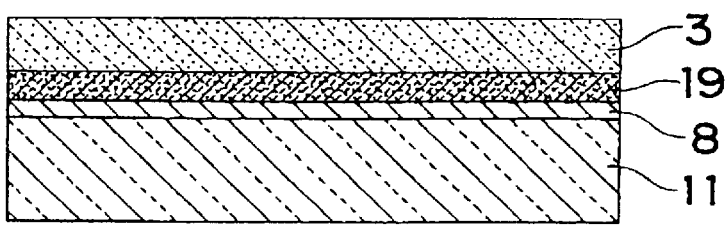

After the formation of the silicide layer 19, the non-doped polycrystalline silicon layer 3 having a predetermined thickness (for example, 1.5 μm) is formed by the use of any known plasma CVD technique to provide the structure shown in FIG. 6B. Since the non-doped polycrystalline silicon layer 3 is deposited by the use of the plasma CVD technique, it can be formed by a low temperature process wherein a heating temperature not higher than 600° C. (specifically within the range of 100 to 600° C.) is employed. It is, however, to be noted that the process of forming the non-doped polycrystalline silicon layer 3 may not be limited to the plasma CVD process, but a catalytic CVD process may be employed to form the non-doped polycrystalline silicon layer 3. Even with the use of the catalytic CVD process, the non-doped polycrystalline silicon layer 3 can be formed in the low temperature process of not higher than 600° C. Since the silicide layer 19 is formed beneath the non-doped polycrystalline silicon layer 3, metallic constituent elements of the silicide layer 19 act as a catalyst at the time of deposition of the polycrystalline silicon layer 3. Then, by lowering the temperature of crystallization, crystallization can be facilitated. Also, the amorphous silicon layer can be reduced. For these reasons, the crystallized polycrystalline silicon layer 3 can be formed on the silicide layer 19. Accordingly, the voltage drop which would occur at the interface can advantageously be reduced.

Figure 6C:
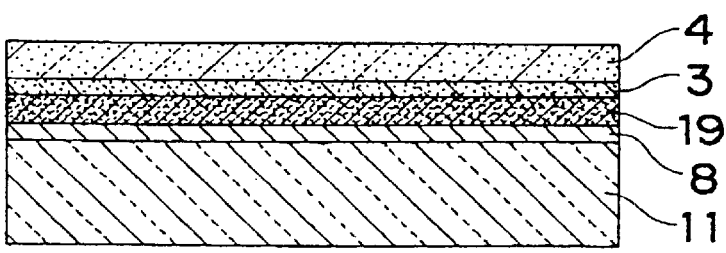

After the formation of the non-doped polycrystalline silicon layer 3, an anodic oxidation process is carried out under a predetermined condition, while the polycrystalline silicon layer 3 is irradiated by light, with the use of an anodizing bath wherein an electrolyte comprising a 55 wt % hydrogen fluoride aqueous solution and ethanol mixed together in a mixing ratio of 1:1 is filled and wherein a platinum electrode (not shown) and the electroconductive layer 8 are used as negative and positive electrodes, respectively. Through this anodic oxidation process, a predetermined depth of the polycrystalline silicon layer 3 down from the surface thereof opposite to the silicide layer 19 is rendered porous to thereby form a porous polycrystalline silicon layer 4 as shown in FIG. 6C. In this third embodiment now under discussion, the anodic oxidation process is carried out in such a manner that throughout the entire period of anodic oxidation the power of light used to irradiate the polycrystalline silicon layer 3 and the current density are kept constant. However, this anodizing condition may be varied suitably (for example, the current density may be variable). Although in the third embodiment now under discussion a surface region of the polycrystalline silicon layer 3 is rendered porous, the polycrystalline silicon layer 3 may be rendered porous in its entirety (that is, the porous polycrystalline silicon layer 4 may be formed directly on the silicide layer 19). In addition, the silicide layer 19 may be rendered to have a porous structure.

Figure 6D:
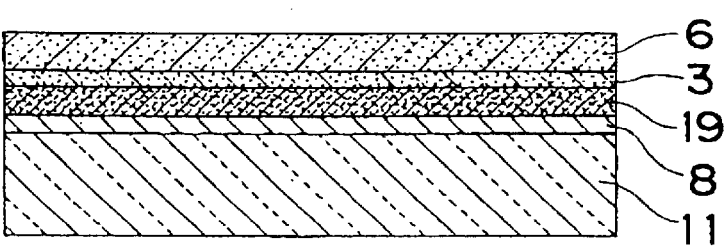

After the anodic oxidation process, the electrolyte is drained from the anodizing bath, and an acid (for example, approximately 10% dilute nitric acid, approximately 10% dilute sulfuric acid or aqua regia) is filled in the anodizing bath. Using the anodizing bath containing the acid and wherein the platinum electrode (not shown) and the electroconductive layer 8 are used as negative and positive electrodes, respectively, a constant current is applied to oxidize the porous polycrystalline silicon layer 4 to form a drift layer 6 as shown in FIG. 6D.

Figure 6E:
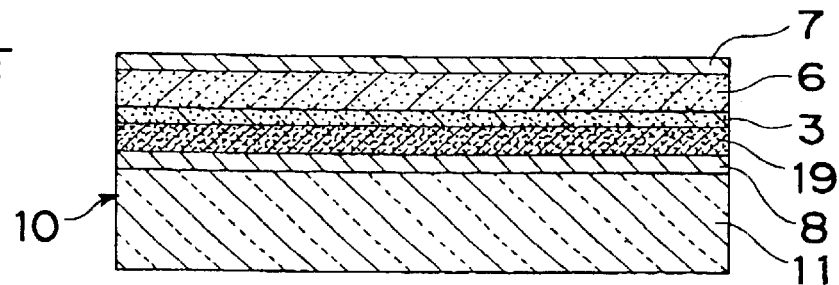

After the formation of the drift layer 6, a surface electrode 7 in the form of an electroconductive thin-film (for example, a gold thin-film) is formed on the drift layer 6 by means of, for example, any known deposition technique, thereby completing the electron source 10 of the structure shown in FIG. 6E. Although in the third embodiment now under discussion the surface electrode 7 has a film thickness of 15 nm, the thickness thereof is not limited thereto and the surface electrode 7 may have any suitable film thickness provided that electrons flowing through the drift layer 6 can be tunneled. Also, although in the third embodiment now under discussion the electroconductive thin-film that eventually forms the surface electrode 7 is formed by any suitable deposition technique, any suitable process other than the deposition technique, for example, a sputtering technique may be employed to form the electroconductive thin-film.

With the method discussed above with reference to FIGS. 6A to 6E, the electron source 10 capable of exhibiting a high electron emission efficiency and a high thermal stability can be obtained. Also, the polycrystalline silicon layer 3 can be formed by the low temperature process such as, for example, the plasma CVD process. The porous polycrystalline silicon layer 4 is oxidized in contact with acid. Also, the surface electrode 7 is formed by the use of the vapor deposition technique or the sputtering technique. The silicide layer 19 as well can be formed at a relatively low temperature. For these reasons, the electron source 10 can be manufactured by the low temperature process of not higher than 600° C. Accordingly, for the insulative substrate 11, a non-alkaline glass substrate that is inexpensive as compared with the quartz glass substrate can be employed. As a result, the manufacturing cost can be reduced and its surface area can be increased. Also, depending on the temperature at which the polycrystalline silicon layer 3 is formed, it is possible to use a glass substrate having a heat resistance that is relatively low as compared with that of the non-alkaline glass substrate such as a low-alkaline glass substrate or a soda lime glass substrate.

As is the case with the first and second embodiments, the electron source 10 fabricated by the method described above has a low dependency of the electron emission characteristic on the degree of vacuum. Also, no popping phenomenon occur at the time of emission of electrons. For this reason, the electron source 10 can emit electrons in a stable fashion.

As is the case with the prior art electron source, and as shown in FIG. 18, the drift layer can be regarded as made up of at least polycrystalline silicon columns 51, thin silicon oxide films 52, fine crystalline silicon layers 63 and silicon oxide films 64. Specifically, in the drift layer 6, it is considered that respective surface regions of the various grains represent a porous structure while core regions thereof remain in a crystalline form.

According to the above-described method, the porous polycrystalline silicon layer 4 is oxidized in contact with acid. However, it may be oxidized by illuminating it with ultraviolet rays under a gaseous atmosphere containing at least one of, for example, oxygen and ozone. In such case, oxidization is preferably carried out at a temperature within the range of 100 to 600° C. Although the temperature at which oxidization is carried out may be higher than 600° C., oxidization is preferred to be carried out at a temperature within the range of 100 to 600° C. since the inexpensive glass substrate can be employed for the insulative substrate 11. Where the silicon substrate of the quartz glass substrate is employed for the substrate, the porous polycrystalline silicon layer 4 may be oxidized by the use of the rapid thermal method (such as, for example, RTO method).

The electron source 10 according to the third embodiment of the present invention basically functions in a manner similar to that shown in FIG. 3. Electrons injected from the electroconductive layer 8 into the drift layer 6 drift within the drift layer 6 and are then emitted through the surface electrode 7. Accordingly, even with the electron source 10 according to the illustrated embodiment, the electrons can be emitted even though the direct current voltage Vps applied between the surface electrode 7 and the electroconductive layer 8 is as low as 10 to 20 volts.

According to the third embodiment, the drift layer 6 is formed of the porous polycrystalline silicon that has been oxidized. However, the drift layer 6 may be formed of porous polycrystalline silicon that has been nitrided, or in the form of a porous polycrystalline semiconductor layer that has been oxidized or nitrided. Also, the silicide layer 19 may not be limited to $WSi_2$, but any metal-to-metal compound including any suitable metallic element and Si may be employed. Examples of such metallic element includes, in addition to W, Ti, V, Cr, Mn, Fe, Co, Ni, Zr, Nb, Mo, Ru, Rh, Pd, Hf, Ta, Re, Os, Ir and Pt. Also, the silicide layer 19 may be a multi-layered structure of silicide films.

Fourth Embodiment

Figure 7:
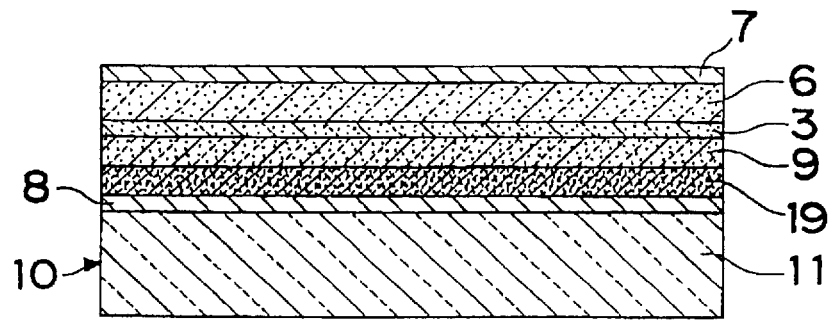
FIG. 7 is a schematic sectional elevation view of the electron source according to a fourth embodiment of the present invention.

The electron source according to the fourth embodiment is substantially similar in structure to that according to the previously described third embodiment. However, the fourth embodiment differs from the third embodiment in that as shown in FIG. 7 pertaining to the fourth embodiment an n-type polycrystalline silicon substrate 9 which is a semiconductor crystal layer having a low resistance is employed on the silicide layer 19 and, on the other hand, a polycrystalline silicon layer 3 is formed on the n-type polycrystalline silicon layer 9.

Even with the electron source 10 according to the fourth embodiment, as is the case with that according to the third embodiment, it can exhibit a high electron emission efficiency and a high thermal stability. The electron source 10 according to the fourth embodiment is of a design wherein the silicide layer 19 intervenes between the electroconductive layer 8 and the n-type polycrystalline silicon layer 9. For this reason, any possible diffusion of constituent elements of the electroconductive layer 8 from the electroconductive layer 8 into the n-type polycrystalline silicon layer 9 can be avoided and the crystalline property of the silicon layer 9 can be improved.

The electron source 10 according to the fourth embodiment can be fabricated by the method substantially identical with that employed to provide the electron source according to the third embodiment, with an exception that a step of forming the-n-type polycrystalline silicon layer 9 is added. The n-type polycrystalline silicon layer 9 can be formed in a manner described in connection with formation of the n-type polycrystalline silicon layer 9 in the first embodiment. However, in place of the n-type polycrystalline silicon layer 9, a p-type polycrystalline silicon layer may be employed.

Although in any one of the first to fourth embodiments of the present invention, the glass substrate has been used for the insulative substrate 11, the substrate 11 may not be limited to such glass substrate and may be a silicon substrate on which an insulating film (such as, for example, an oxide film of SiOx or AlOx, or a nitride film of SiNx, BN or AlNx) has been formed, or a metallic substrate on which an insulating film (such as, for example, an oxide film or a nitride film) has been formed.

Fifth Embodiment

Figure 8:
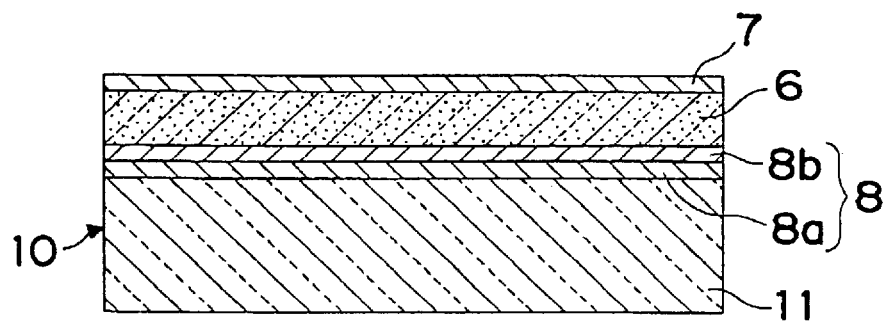
FIG. 8 is a schematic sectional elevation view of the electron source according to a fifth embodiment of the present invention.
Figure 9:
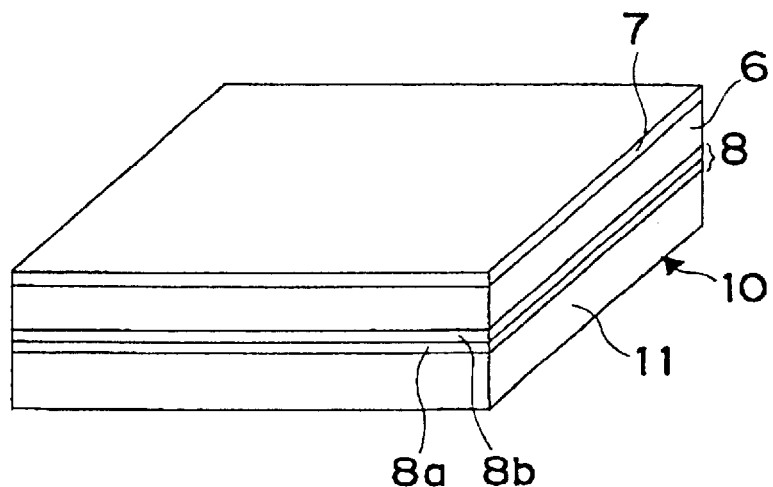
FIG. 9 is a schematic perspective view of the electron source shown in FIG. 8.

Referring to FIGS. 8 and 9, the electron source 10 shown therein includes an insulative substrate 11 in the form of a glass substrate (for example, a non-alkaline glass substrate). On one major surface of the insulative substrate 1, an electroconductive layer made of electroconductive material is formed. A drift layer 6 made of an oxidized porous polycrystalline silicon is formed on the electroconductive layer 8.

Figure 10:
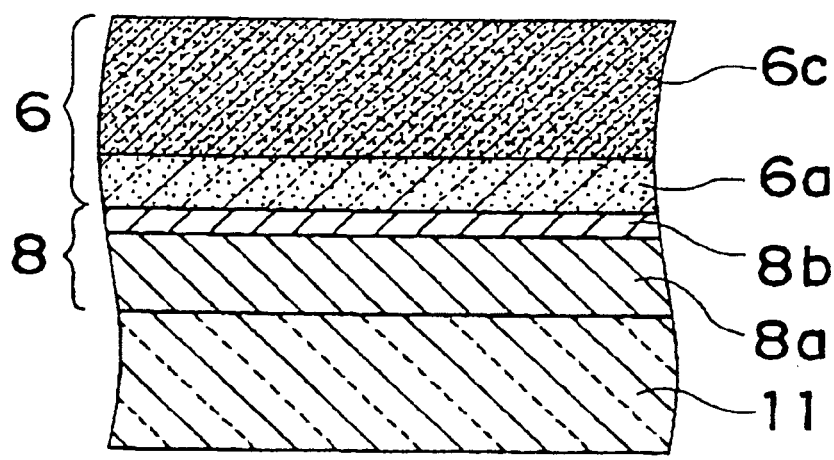
FIG. 10 is a schematic sectional elevation view of a main portion of the electron source shown in FIG. 8.

In the fifth embodiment, the electroconductive layer 8 is comprised of upper and lower electroconductive films 8a and 8b laminated one above the other in a direction across the thickness thereof. The upper electroconductive film 8b remote from the substrate 11 is made of an electroconductive material of a kind having a property that can easily react with silicon at a temperature (for example, in the range of 100 to 600° C.) which is about equal to the temperature at which the drift layer 6 is formed. On the other hand, the lower electroconductive film 8a adjacent the substrate 11 is made of an electroconductive material of a kind having a property hard to react with silicon. In other words, in the fifth embodiment, a surface portion of the electroconductive layer 8 adjacent the drift layer 6 is made of an electroconductive material of a kind capable of suppressing formation of an amorphous layer in the drift layer 6. For this reason, as shown in FIG. 10, the amorphous layer 6a contained in the drift layer 6 can be reduced (i.e., the film thickness of the amorphous layer 6a can be reduced). Accordingly, the amount of electrons emitted can be increased while reduction of the manufacturing cost is secured.

Although the electroconductive layer 8 employed in the fifth embodiment has been described as composed of the two electroconductive films 8a and 8b, three or more electroconductive films laminated one above the other may be employed therefor. In such case, the uppermost electroconductive film and the lowermost electroconductive film, remote from and adjacent the substrate 11, respectively, should have respective properties similar to those of the upper and lower electroconductive films 8b and 8a.

Figure 11:
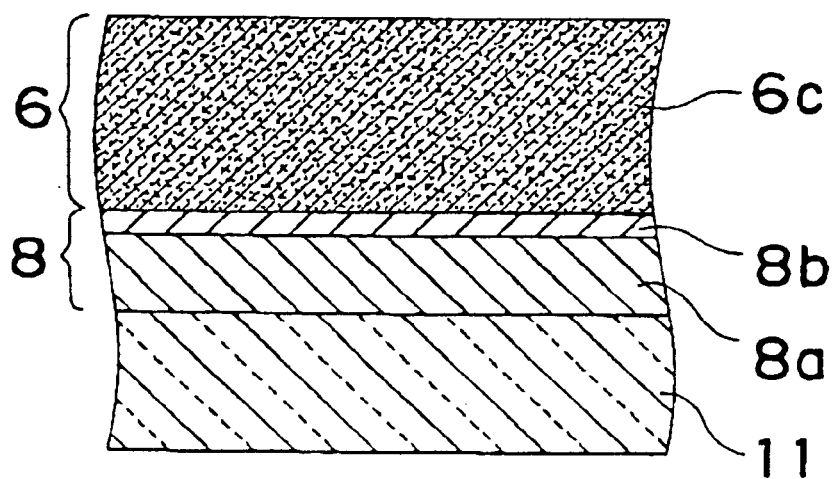
FIG. 11 is a schematic sectional elevation view, showing a main portion of a modified form of the electron source according to the fourth embodiment.
Figure 20:
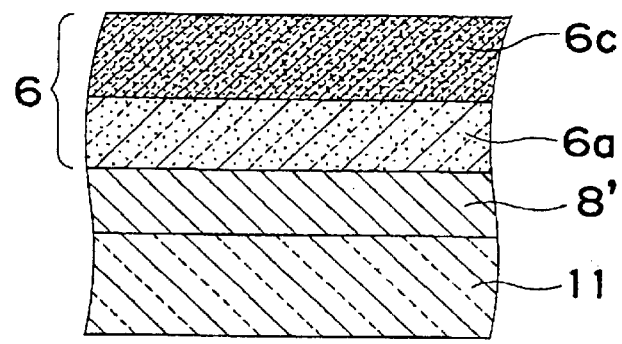
FIG. 20 is a schematic sectional elevation view of a main portion of the prior art electron source shown in FIG. 19.
Figure 21:
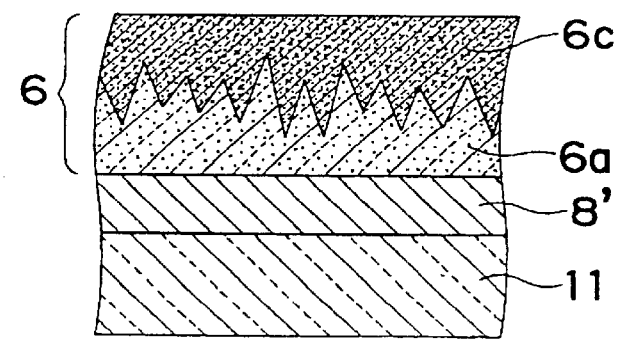
FIG. 21 is a schematic sectional elevation view, showing the portion of the prior art electron source shown in FIG. 19.

In the fifth embodiment, the upper electroconductive film 8b is made of aluminum (Al) while the lower electroconductive film 8a is made of copper (Cu) having a resistance lower than that of aluminum (and, hence, the resistance of the electroconductive layer 8 as a whole is low). However, in place of aluminum, the upper electroconductive film 8b may be made of nickel (Ni), cobalt (co), chromium (Cr), hafnium (Hf), molybdenum (Mo), palladium (Pd), platinum (Pt), rhodium (Rh), tantalum (Ta), titan (Ti), tungsten (W) or zirconium (Zi), or an oxide thereof. Further, there may be used an alloy film formed of plural ones in the above-mentioned metals, or an alloy-silicide film including at least one of the above-mentioned metals and Si. On the other hand, the lower electroconductive film 8a may be made of a low resistance material (wiring material) such as, for example, copper, silver or aluminum. A material capable of exhibiting a high adhesion with glass, such as chromium or titan may also be employed therefor. In addition, a multi-layered structure of those materials may be employed.

Where aluminum is employed as material for the upper electroconductive film 8b, as shown in FIG. 10, the film thickness of the amorphous layer 6a can be sufficiently reduced down to a value smaller than that in the prior art shown in FIG. 20. Also, variation in thickness of the amorphous layer 6a can also be minimized (the interface between the amorphous layer 6a and the crystallized layer 6c becomes substantially flat). For this reason, variation of the field intensity at various regions of the drift layer 6 can advantageously be minimized. Accordingly, no localized distribution of energies of the electrons emitted from the surface electrode 7 will occur. Also, where nickel is employed as material for the upper electroconductive film 8b, as shown in FIG. 11, the drift layer 6 can be defined only by the crystallized layer 6c and no amorphous layer 6a is formed. For this reason, as compared with the use of aluminum for the upper electroconductive film 8b, the electron emission efficiency can be increased.

The upper electroconductive film 8b preferably has a film thickness as small as possible. If this film thickness is not greater than 50 nm, it appears that the amount of diffusion of metallic elements from the upper electroconductive film 8b into the drift layer 6 can be reduced. For this reason, it appears that any possible increase of the probability of scattering of the electrons within the drift layer can be suppressed to thereby suppress any possible reduction of the electron emission efficiency. The film thickness of the upper electroconductive film 8b should be selected in consideration of the diffusion of the metallic elements discussed above so as to be sufficiently smaller than the thickness of the drift layer 6.

The process for manufacturing the electron source 10 according to the fifth embodiment will now be described with reference to FIGS. 12A to 12E.

Figure 12A:
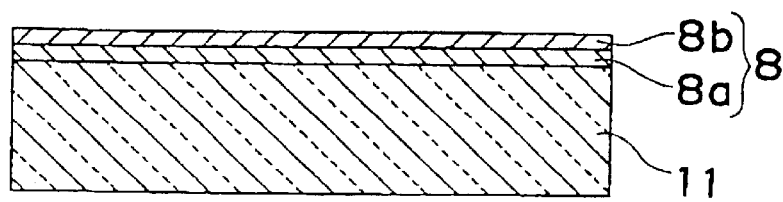
FIGS. 12A to 12E are schematic sectional elevation views of the intermediate or final products, showing the sequence of manufacture of the electron source shown in FIG. 8.

At the outset, the lower electroconductive film 8a is deposited on one major surface (upper surface in FIG. 12A) of the insulative substrate 11, followed by formation of the upper electroconductive film 8b over the lower electroconductive film 8a to complete the electroconductive layer 8 as shown in FIG. 12A.

Figure 12B:
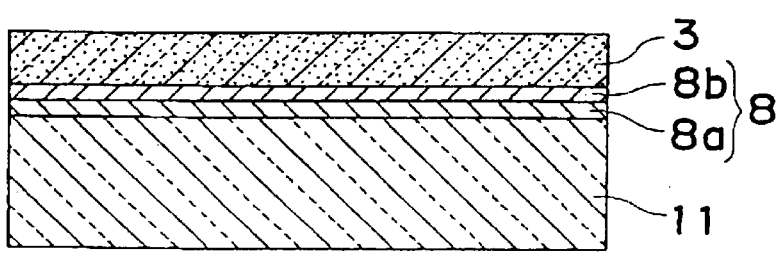

After the formation of the electroconductive layer 8 comprised of the lower and upper electroconductive films 8a and 8b, a non-doped polycrystalline silicon layer 3 of a predetermined thickness (for example, 1.5 $\mu$m) is formed on the upper electroconductive layer 8b by the use of, for example, any known plasma CVD technique as shown in FIG. 12B. Since the non-doped polycrystalline silicon layer 3 is deposited by the use of the plasma CVD technique, it can be formed by a low temperature process wherein a heating temperature not higher than 600° C. (specifically within the range of 100 to 600° C.) is employed. It is, however, to be noted that the process of forming the non-doped polycrystalline silicon layer 3 may not be limited to the plasma CVD process, but a catalytic CVD process may be employed to form the non-doped polycrystalline silicon layer 3. Even with the use of the catalytic CVD process, the non-doped polycrystalline silicon layer 3 can be formed in the low temperature process of not higher than 600° C.

Figure 12C:
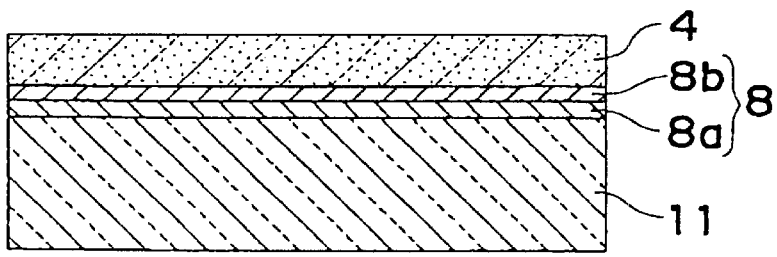

After the formation of the non-doped polycrystalline silicon layer 3, an anodic oxidation process is carried out under a predetermined condition, while the polycrystalline silicon layer 3 is irradiated by light, with the use of an anodizing bath wherein an electrolyte comprising a 55 wt % hydrogen fluoride aqueous solution and ethanol mixed together in a mixing ratio of 1:1 is filled and wherein a platinum electrode (not shown) and the electroconductive layer 8 are used as negative and positive electrodes, respectively. Through this anodic oxidation process, a porous polycrystalline silicon layer 4 can be obtained as shown in FIG. 12C. In this fifth embodiment now under discussion, the anodic oxidation process is carried out in such a manner that throughout the entire period of anodic oxidation the power of light used to irradiate the polycrystalline silicon layer 3 and the current density are kept constant. However, this anodizing condition may be varied suitably (for example, the current density may be variable).

Figure 12D:
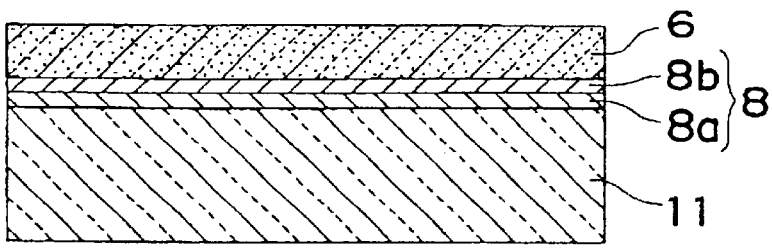

After the anodic oxidation process, the electrolyte is drained from the anodizing bath, and an acid (for example, approximately 10% dilute nitric acid, approximately 10% dilute sulfuric acid or aqua regia) is filled in the anodizing bath. Using the anodizing bath containing the acid and wherein the platinum electrode (not shown) and the electroconductive layer 8 are used as negative and positive electrodes, respectively, a constant current is applied to oxidize the porous polycrystalline silicon layer 4 to form a drift layer 6 as shown in FIG. 12D.

Figure 12E:
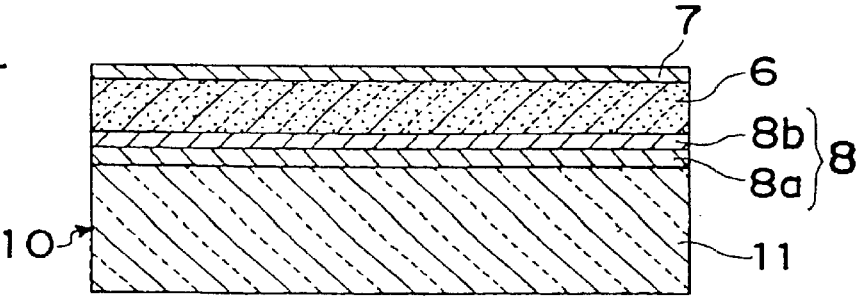

After the formation of the drift layer 6, a surface electrode 7 in the form of an electroconductive thin-film (for example, a gold thin-film) is formed on the drift layer 6 by means of, for example, any known deposition technique, thereby completing the electron source 10 of the structure shown in FIG. 12E. Although in the firth embodiment now under discussion the surface electrode 7 has a film thickness of 15 nm, the thickness thereof is not limited thereto and the surface electrode 7 may have any suitable film thickness provided that electrons flowing through the drift layer 6 can be tunneled. Also, although in the fifth embodiment now under discussion the electroconductive thin-film that eventually forms the surface electrode 7 is formed by any suitable vapor deposition technique, any suitable process other than the deposition technique, for example, a sputtering technique may be employed to form the electroconductive thin-film.

With the method discussed above, the polycrystalline silicon layer 3 can be formed by the low temperature process such as, for example, the plasma CVD process. The porous polycrystalline silicon layer 4 is oxidized in contact with acid. Also, the surface electrode 7 is formed by the use of the vapor deposition technique or the sputtering technique. For these reasons, the electron source 10 can be manufactured by the low temperature process of not higher than 600° C. Accordingly, for the insulative substrate 11, a non-alkaline glass substrate that is inexpensive as compared with the quartz glass substrate can be employed. As the result, the manufacturing cost can be reduced and its surface area can be increased. Also, depending on the temperature at which the polycrystalline silicon layer 3 is formed, it is possible to use a glass substrate having a heat resistance that is relatively low as compared with that of the non-alkaline glass substrate such as a low-alkaline glass substrate or a soda lime glass substrate.

Moreover, the upper electroconductive film 8b of the electroconductive layer 8 is formed of the material that can easily react with silicon (that is, a constituent element of the polycrystalline silicon layer 3) at the temperature at which the polycrystalline silicon layer 3 is formed. For this reason, formation of the amorphous layer within the polycrystalline silicon layer 3 can be suppressed (that is, formation of the amorphous layer during an initial stage of deposition of the polycrystalline silicon layer 3 can be suppressed). As the result, increase of the resistance of the drift layer 6 over a required value can be prevented (and the drift layer 6 can have a resistance comparable to that of the drift layer 6 employed in the prior art electron source 10' using the n-type silicon substrate 1). Accordingly, the electron emission efficiency can be increased.

The electron source 10 fabricated by the method described above has a low dependency of the electron emission characteristic on the degree of vacuum as is the case with the electron source disclosed in the previously discussed Japanese Patents No. 296684 (Japanese Patent application No. 10-272340) and No. 2987140 (Japanese Patent application No. 10-272342). Also, no popping phenomenon occur at the time of emission of electrons. For this reason, the electron source 10 can emit electrons in a stable fashion.

According to the above-described method, the porous polycrystalline silicon layer 4 is oxidized in contact with acid. However, it may be oxidized by illuminating it with ultraviolet rays under a gaseous atmosphere containing at least one of, for example, oxygen and ozone. In such case, oxidization is preferably carried out at a temperature within the range of 100 to 600° C. Although the temperature at which oxidization is carried out may be higher than 600° C., oxidization is preferred to be carried out at a temperature within the range of 100 to 600° C. since the inexpensive glass substrate can be employed for the insulative substrate 11. The film thickness of the upper electroconductive film 8b is preferred to be not greater than 50 nm because of the following reason. Specifically, if the upper electroconductive film 8b has a film thickness greater than 50 nm, the metal element forming the upper electroconductive film 8b will be diffused in a large amount into the polycrystalline silicon layer 3, resulting in the polycrystalline silicon layer 3 forming into a silicide layer. Also, since this silicide layer is rendered porous, it is suspected that even though the drift layer 6 is formed, the electron emission efficiency will be lowered as a result of increase of the probability of scattering of the electrons within the drift layer during operation of the electron source. In other words, the film thickness of the upper electroconductive film 8a should be so selected as to minimize the amount of diffusion into the drift layer 6 (while permitting only diffusion into a region of the electroconductive layer 8 adjacent the drift layer 6) to thereby minimize any possible influence upon the electron emission efficiency.

When the upper electroconductive film 8b is made of the material of a kind hard to diffuse into any of the polycrystalline silicon layer 3, the porous polycrystalline silicon layer 4 and the drift layer 6, rather than aluminum (that is, of a kind capable of exhibiting a high diffusion enthalpy), diffusion of the elements forming the upper electroconductive film 8b which would occur as a result of increase of temperature during the manufacture and/or operation can be effectively suppressed. The diffusion enthalpy of aluminum is generally 329 kJ/mol (78.7 Kcal/mol). The material capable of exhibiting a higher diffusion. enthalpy than aluminum includes Ni, Co, Cr, Hf Mo, Pd, Pt, Rh, Ta, Ti, W, Zr or an oxide thereof.

Figure 13:
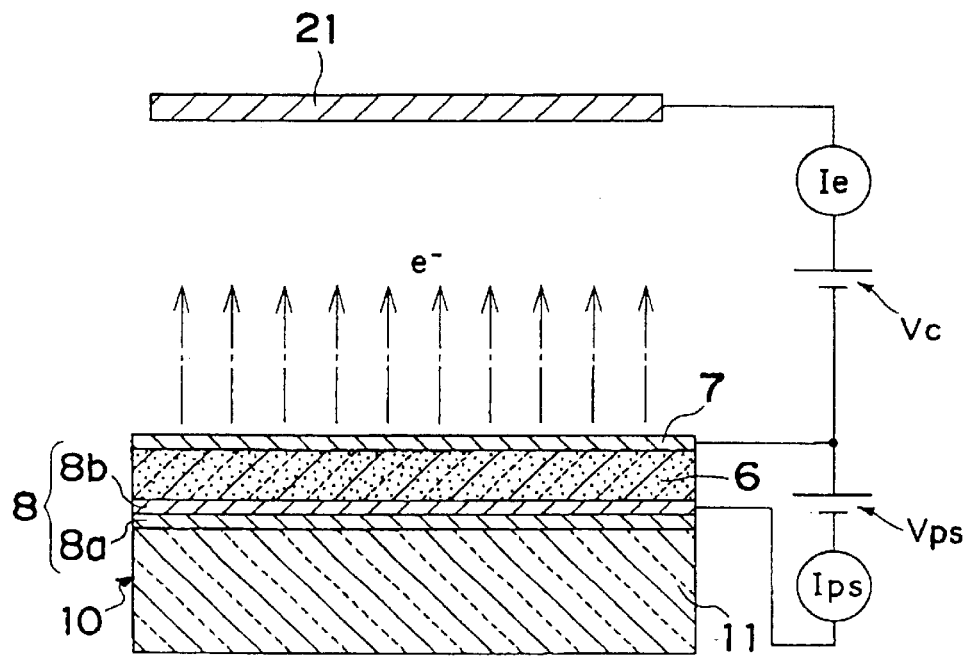
FIG. 13 is a schematic view of the electron source of FIG. 8, showing the manner in which electrons are emitted from the electron source.

The electron source 10 according to the fifth embodiment basically functions in a manner similar to that of the first embodiment shown in FIG. 3. By way of example as shown in FIG. 13, electrons injected from the electroconductive layer 8 into the drift layer 6 drift within the drift layer 6 and are then emitted through the surface electrode 7. Accordingly, even with the electron source 10 according to the fifth embodiment, the electrons can be emitted even though the direct current voltage Vps applied between the surface electrode 7 and the electroconductive layer 8 is as low as 10 to 20 volts.

Figure 14:
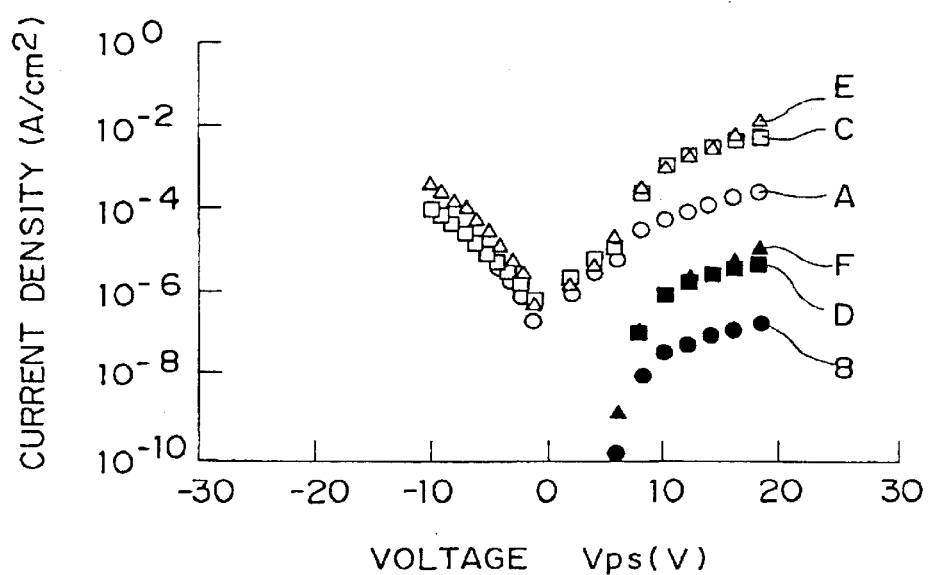
FIG. 14 is a graph showing an electron emission characteristic exhibited by the electron source of FIG. 8.

FIG. 14 illustrates the electron emission characteristic of the electron source 10 fabricated by the method described above. In FIG. 14, the axis of abscissas represents the direct current voltage Vps applied while the axis of ordinates represents the current density. In the graph of FIG. 14, a group of void circles A (○) represent change of the diode current Ips exhibited by the electron source 10 wherein the electroconductive layer 8 is of a W/Ti structure (that is, wherein the upper and lower electroconductive films 8b and 8a are made of W and Ti, respectively); a group of darkened circles B (●) represent change of the current Ie of the emitted electrons exhibited by the electron source 10 wherein the electroconductive layer 8 is of the W/Ti structure; a group of squares C (□) represent change of the diode current Ips exhibited by the electron source 10 wherein the electroconductive layer 8 is of an Al—Si/W/Ti structure (that is, wherein the upper and lower electroconductive films 8b and 8a are made of Al—Si and Ti, respectively); a group of darkened squares D (■) represent change of the current Ie of the emitted electrons exhibited by the electron source 10 wherein the electroconductive layer 8 is of the Al—Si/W/Ti structure; a group of triangles E (△) represent change of the diode current Ips exhibited by the electron source 10 wherein the electroconductive layer 8 is of a Ni/W/Ti structure (that is, wherein the upper and lower electroconductive films 8b and 8a are made of Ni and Ti, respectively); and a group of darkened triangles F (▲) represent change of the current Ie of the emitted electron exhibited by the electron source wherein the electroconductive layer 8 is of the Ni/W/Ti structure.

Figure 15:
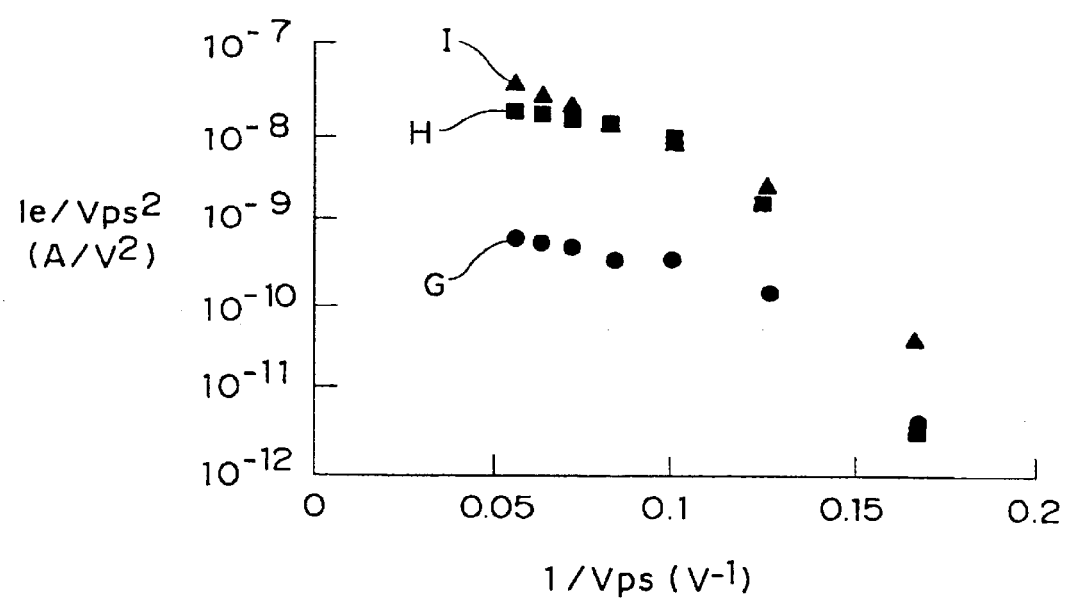
FIG. 15 is a chart showing Fowler-Nordheim plots based on the data shown in the graph of FIG. 14.
Figure 16:
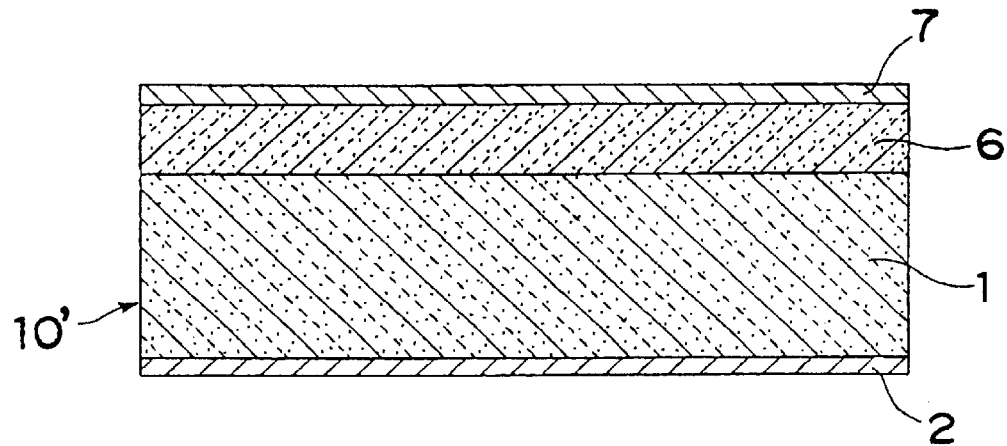
FIG. 16 is a schematic sectional elevation view of the prior art electron source.

FIG. 15 illustrates a chart showing Fowler-Nordheim plots based on the date on the current Ie of the emitted electrons and the direct current voltage Vps shown in the graph of FIG. 14. In the graph of FIG. 15, a group of darkened squares H (■) represent the data associated with the electron source 10 wherein the electroconductive layer 8 is of the W/Ti structure; a group of darkened triangles I (▲) represent those wherein the electroconductive layer 8 is of the Al—Si/W/Ti structure; and a group of darkened circles G (●) represent those wherein the electroconductive layer 8 is of the Ni/W/Ti structure. Regardless of the nature of the electroconductive layer 8, the condition under which an anodic oxidation process was carried out was such that the current density was 12.5 mA/cm$^2$ and was supplied for 6 seconds. Also, regardless of the nature of the electroconductive layer 8, the condition under which oxidization with the use of an acid was carried was such that the voltage applied was 20 volts and the current density was 12.5 mA/cm$^2$. The upper electroconductive film 8b was 50 nm in film thickness. The direct current voltage Vc during the characteristic measurement was fixed at 100 volts.

FIG. 14 makes it clear that the favorable current Ie of the emitted electrons and the favorable electron emission efficiency (Ie/Ips) have been obtained.

In the fifth embodiment, the drift layer 6 is formed of an oxidized porous polycrystalline silicon. However, the drift layer 6 may be formed of a nitrided porous polycrystalline silicon, or in the form of an oxidized or nitrided porous polycrystalline semiconductor layer.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A field emission-type electron source which comprises:
   a substrate;
   an electroconductive layer formed on a major surface of the substrate;
   a low resistance semiconductor layer composed of a low resistance semiconductor material formed on the electroconductive layer;
   a non-doped semiconductor layer formed on the low resistance semiconductor layer;
   a strong electrical field drift layer in the form of an oxidized or nitrided porous semiconductor layer formed on a surface of the non-doped semiconductor layer remote from the electroconductive layer; and
   a surface electrode formed on the strong electrical field drift layer, in which
   when a voltage is applied with the surface electrode used as a positive electrode relative to the electroconductive layer, electrons injected from the electroconductive layer drift in the strong electrical field drift layer and are then emitted through the surface electrode.

2. The field emission-type electron source as claimed in claim 1, wherein at least a portion of the electroconductive layer adjacent the strong electrical field drift layer with respect to a direction of thickness thereof is made of an electroconductive material effective to suppress formation of an amorphous layer in the strong electrical field drift layer.

3. The field emission-type electron source as claimed in claim 2, wherein the electroconductive layer is made up of at least two electroconductive films laminated one above the other, and wherein the uppermost one of the electroconductive films has a property of easily reacting with a semiconductor at about a temperature at which the strong electrical field drift layer is formed.

4. The field emission-type electron source as claimed in claim 3, wherein the uppermost electroconductive film is made of Al, Ni, or an alloy including Al and Ni as main components.

5. The field emission-type electron source as claimed in claim 3, wherein the uppermost electroconductive film has a film thickness not greater than 50 nm.

6. The field emission-type electron source as claimed in claim 3, wherein the uppermost electroconductive film is made of a material hard to diffuse into the strong electrical field drift layer as compared with Al.

7. The field emission-type electron source as claimed in claim 1, further comprising a silicide layer interposed between the electroconductive layer and the low resistance semiconductor layer and effective to lower the resistance of the low resistance semiconductor layer.

8. The field electron emission-type election source as claimed in claim 1, wherein the low resistance semiconductor layer comprises a plurality of films having different resistances and wherein one of the films closer to the electroconductive layer exhibiting a lower resistance.

9. The field electron emission-type electron source claimed in claim 1, wherein the low resistance semiconductor layer is of a structure having a continuously varying resistance, with a portion of the low resistance semiconductor layer closer to the electroconductive layer exhibiting a lower resistance to thereby reduce the resistance of the low resistance semiconductor layer.

10. The field electron emission-type electron source as claimed in claim 1, wherein the low resistance semiconductor layer is formed by heating to crystallize after formation of an amorphous semiconductor layer.

11. The field emission-type electron source as claimed in claim 1, wherein the low resistance semiconductor layer is formed by crystallizing an amorphous semiconductor layer using hydrogen after formation of the amorphous semiconductor layer.

12. The field emission-type electron source as claimed in claim 1, wherein the low resistance semiconductor layer is a low resistance amorphous semiconductor layer doped with impurities.

13. The field emission-type electron source as claimed in claim 1, further comprising impurities added to the low resistance semiconductor layer to reduce resistance.

14. The field emission-type electron source as claimed in claim 13, further comprising impurities added to the low resistance semiconductor layer to form another semiconductor layer over the low resistance semiconductor layer.

15. The field emission-type electron source as claimed in claim 1, wherein heat treatment has been carried out after formation of at least one of the low resistance semiconductor layer, a porous semiconductor layer, the strong electrical field drift layer and the surface electrode.

16. The field emission-type electron source as claimed in claim 1, wherein the strong electrical field drift layer includes semiconductor crystalline columns lying perpendicular to the major surface of the substrate, fine semiconductor crystals in nanometer order positioned among the semiconductor crystalline columns and insulating films having a film thickness smaller than a crystal size of the fine semiconductor crystals and formed on surfaces of the fine semiconductor crystals.

17. The field emission-type electron source as claimed in claim 1, wherein the semiconductor layer is made of a polycrystalline semiconductor.

18. The field emission-type electron source as claimed in claim 17, wherein the polycrystalline semiconductor is made of a semiconductor material capable of being formed by a low temperature process of not higher than 600° C.

19. A field emission-type electron source which comprises:

a substrate;

an electroconductive layer formed on a major surface of the substrate;

a semiconductor layer formed on the electroconductive layer;

a strong electrical field drift layer in the form of an oxidized or nitrided porous semiconductor layer formed on a surface of the semiconductor layer remote from the electroconductive layer; and a surface electrode formed on the strong electrical field drift layer;

at least a portion of the electroconductive layer adjacent the strong electrical field drift layer with respect to a direction of thickness thereof is made of an electroconductive material effective to suppress formation of an amorphous layer in the strong electrical field drift layer, and the electroconductive layer is made up of at least two electroconductive films laminated one above the other, and wherein the uppermost one of the electroconductive films has a property of easily reacting with a semiconductor at about a temperature at which the strong electrical field drift layer is formed, in which when a voltage is applied with the surface electrode used as a positive electrode relative to the electroconductive layer, electrons injected from the electroconductive layer drift in the strong electrical field drift layer and are then emitted through the surface electrode.

* * * * *

UNITED STATES PATENT AND TRADEMARK OFFICE
CERTIFICATE OF CORRECTION

PATENT NO. : 6,765,342 B1
DATED : July 20, 2004
INVENTOR(S) : Y. Honda et al.

It is certified that error appears in the above-identified patent and that said Letters Patent is hereby corrected as shown below:

Title page,
Item [73], Assignee, "Work" should be -- Works --.
Item [56], References Cited, U.S. PATENT DOCUMENTS, add the following references:
-- 6,285,118    09/04/01    Hatai et al.
   6,498,426    12/24/02    Watabe et al.
   6,583,578    06/24/03    Ichihara et al.
   6,590,321    07/08/03    Komoda et al. --
FOREIGN PATENT DOCUMENTS "08986353" should be -- 0896353 --.

Signed and Sealed this

Eighth Day of March, 2005

JON W. DUDAS
*Director of the United States Patent and Trademark Office*